United States Patent
Hussain et al.

(10) Patent No.: US 8,761,981 B2
(45) Date of Patent: Jun. 24, 2014

(54) METHOD AND APPARATUS FOR A VEHICLE CONTROL UNIT (VCU), USING CURRENT AND HISTORICAL INSTANTANEOUS POWER USAGE DATA, TO DETERMINE OPTIMUM POWER SETTINGS FOR A HYBRID ELECTRIC DRIVE SYSTEM

(75) Inventors: Agha Shaheryar Hussain, Ajax (CA); Agha Bakhtiar Hussain, Sunnyvale, CA (US); David P. Lautzenheiser, Los Altos, CA (US)

(73) Assignee: Fuel Motion Inc., Sunnyvale, CA (US)

( * ) Notice: Subject to any disclaimer, the term of this patent is extended or adjusted under 35 U.S.C. 154(b) by 498 days.

(21) Appl. No.: 13/317,430

(22) Filed: Oct. 18, 2011

(65) Prior Publication Data
US 2013/0096745 A1    Apr. 18, 2013

(51) Int. Cl.
B60L 9/00    (2006.01)
B60L 11/00    (2006.01)

(52) U.S. Cl.
USPC ............... 701/22; 180/65.28; 180/65.265; 903/903

(58) Field of Classification Search
USPC .............. 701/22; 180/65.265, 65.28; 903/930
See application file for complete search history.

(56) References Cited

U.S. PATENT DOCUMENTS

| | | | |
|---|---|---|---|
| 6,275,231 B1 | 8/2001 | Obradovich et al. | |
| 6,330,497 B1 | 12/2001 | Obradovich et al. | |
| 6,438,465 B2 | 8/2002 | Obradovich et al. | |
| 6,542,795 B2 | 4/2003 | Obradovich et al. | |
| 6,577,928 B2 | 6/2003 | Obradovich et al. | |
| 6,587,759 B2 | 7/2003 | Obradovich et al. | |
| 6,754,485 B1 | 6/2004 | Obradovich et al. | |
| 6,987,964 B2 | 1/2006 | Obradovich et al. | |
| 7,173,344 B2 * | 2/2007 | Yang ............................ | 290/4 R |
| 7,398,147 B2 | 7/2008 | Kozarekar et al. | |
| 7,407,026 B2 * | 8/2008 | Tamor ........................ | 180/65.28 |
| 7,564,156 B2 | 7/2009 | Okumoto et al. | |
| 7,779,281 B1 | 8/2010 | Brumett, Jr. et al. | |
| 7,836,986 B1 * | 11/2010 | Gillecriosd ................ | 180/65.21 |
| 8,204,638 B2 * | 6/2012 | Tani et al. ...................... | 701/22 |

(Continued)

FOREIGN PATENT DOCUMENTS

| | | | |
|---|---|---|---|
| CN | 103189261 A | * | 7/2013 |
| EP | 2636568 A1 | * | 9/2013 |
| JP | PCT/JP2010/069586 | * | 5/2013 |
| WO | WO 2012059998 A1 | * | 5/2012 |

OTHER PUBLICATIONS

On the Subject of Solar Vehicles and the Benefits of the Technology; Connors, J.; Clean Electrical Power, 2007. ICCEP '07. International Conference on; Digital Object Identifier: 10.1109/ICCEP.2007.384287; Publication Year: 2007 , pp. 700-705.*

(Continued)

*Primary Examiner* — Cuong H Nguyen
(74) *Attorney, Agent, or Firm* — Erwin J. Basinski

(57) ABSTRACT

A Vehicle Control Unit (VCU) apparatus and method for controlling the elements of a Hybrid Electric Drive Powered Vehicle are disclosed, wherein the VCU uses Current and Historical Route Data to determine Instantaneous Power required by each of the elements, and wherein the VCU controls the Instantaneous Power used by each of the elements to minimize an amount of hydrocarbon fuel used while the vehicle is being driven, while also maintaining an acceptable battery state of charge and providing vehicle drive power as needed.

12 Claims, 21 Drawing Sheets

Drive Motor 1 / Generator Operation

(56) References Cited

U.S. PATENT DOCUMENTS

| | | | |
|---|---|---|---|
| 2007/0170778 A1 | 7/2007 | Yamaguchi | |
| 2009/0030568 A1* | 1/2009 | Amano et al. | 701/22 |
| 2009/0177345 A1* | 7/2009 | Severinsky et al. | 701/22 |
| 2009/0259355 A1* | 10/2009 | Li | 701/22 |
| 2010/0063658 A1 | 3/2010 | Martin et al. | |
| 2010/0099532 A1* | 4/2010 | Cashen | 475/5 |
| 2010/0137094 A1* | 6/2010 | Pohl | 475/149 |
| 2013/0091694 A1* | 4/2013 | Hussain et al. | 29/593 |
| 2013/0096745 A1* | 4/2013 | Hussain et al. | 701/22 |
| 2013/0096746 A1* | 4/2013 | Hussain et al. | 701/22 |
| 2013/0096747 A1* | 4/2013 | Hussain et al. | 701/22 |
| 2013/0096748 A1* | 4/2013 | Hussain et al. | 701/22 |
| 2013/0096749 A1* | 4/2013 | Hussain et al. | 701/22 |
| 2013/0253744 A1* | 9/2013 | Nishimine et al. | 701/22 |

OTHER PUBLICATIONS

A Stochastic Optimal Control Approach for Power Management in Plug-In Hybrid Electric Vehicles; Moura, S.J. ; Fathy, H.K. ; Callaway, D.S. ; Stein, J.L.; Control Systems Technology, IEEE Transactions on; vol. 19 , Issue: 3; Digital Object Identifier: 10.1109/TCST.2010.2043736 ; Publication Year: 2011 , pp. 545-555.*

A study on look-ahead control and energy management strategies in hybrid electric vehicles; Ganji, B. ; Kouzani, A.Z. Control and Automation (ICCA), 2010 8th IEEE International Conference on; Digital Object Identifier: 10.1109/ICCA.2010.5524178 Publication Year: 2010 , pp. 388-392.*

Power management and economic estimation of fuel cell hybrid vehicle using fuzzy logic; Xiangjun Li ; Jianqiu Li ; Liangfei Xu ; Minggao Ouyang; Vehicle Power and Propulsion Conference, 2009. VPPC '09. IEEE; Digital Object Identifier: 10.1109/VPPC.2009.5289696; Publication Year: 2009 , pp. 1749-1754.*

PEV Charging Profile Prediction and Analysis Based on Vehicle Usage Data; Ashtari, A. ; Bibeau, E. ; Shahidinejad, S. ; Molinski, T. Smart Grid, IEEE Transactions on; vol. 3 , Issue: 1; Digital Object Identifier: 10.1109/TSG.2011.2162009; Publication Year: 2012 , pp. 341-350.*

Power-mix optimization for a hybrid ultracapacitor/battery pack in an electric vehicle using real-time GPS data; Moshirvaziri, M. ; Malherbe, C. ; Moshirvaziri, A. ; Trescases, O.; Industrial Electronics Society, IECON 2013—39th Annual Conf. of the IEEE Digital Object Identifier: 10.1109/IECON.2013.6699888; Pub Year: 2013 , pp. 4666-4671.*

Forecasting driving behavior to enable efficient grid integration of plug-in electric vehicles; Goebel, C. ; Voss, M. Online Conference on Green Communications (GreenCom), 2012 IEEE; Digital Object Identifier: 10.1109/GreenCom.2012.6519619; Publication Year: 2012 , pp. 74-79.*

Performance analysis of a hybrid dual rotor motor for electric vehicle application; Ansari, M.N. ; Singh, A.K. ; Kumar, P. Electrical Machines (ICEM), 2012 XXth International Conference on; Digital Object Identifier: 10.1109/ICEIMach.2012.6350156 Publication Year: 2012 , pp. 2002-2007.*

Karim Nice and Julia Layton—How Hybrid Cars Work, Introduction http://auto.howstuffworks.com/hybrid-car.htm#=visited 2009.

Karim Nice and Julia Layton—How Hybrid Cars Work—gasoline power vs electric power, visited 2009 http://auto.howstuffworks.com/hybrid-car2.htm#.

Marshall Brain—How Electric Cars Work—visited 2009 http://auto.howstuffworks.com/electric-car1.htm#.

Marshall Howard Brain—How Electric Cars Work—an example—visited 2009 http://auto.howstuffworks.com/electric-car2.htm#.

Marshall Howard Brain—How Electric Cars Work—inside an electric car—visited 2009 http://auto.howstuffworks.com/electric-car3.htm#.

Karim Nice and Julia Layton—How Hybrid Cars Work—performance http://auto.howstuffworks.com/hybrid-car4.htm# Visited 2009.

Marshall Howard Brain—How Electric Cars Work—Motors and batterys http://auto.howstuffworks.com/electric-car4.htm# visited 2009.

Marshall Brain—How Electric Cars Work—Doing a Conversion. http://auto.howstuffworks.com/electric-car8.htm# visited 2009.

Marshall Brain—How electric Cars Work visited 2009 http://auto.howstuffworks.com/electric-car5.htm.

Khalid Benlyazid and Levent U. Gökdere, Powerpoint Presentation: Hybrid Electric Car: University of South Carolina, date unknown—est. circa 1999.

Diesel-Electric Hybrid Vehicles: white paper from http://www.dieselforum.org/files/dmfile/DieselElectricHybridVehicles.pdf.

3) H C Lovatt et al, Power Transfer in Hybrid Electric Vehicles With Multiple Energy Storage Units: Intl. Conf. Power Electronics, Machines and Drives, Jun. 2002. p. 171-176.

Timothy C. Moore, Ultralight Hybrid Vehicles: Principles and Design: 13th intl. Electric Vehicle Symposium, (EVS-13) 1996, Osaka, Japan pp. 1-8.

Karen I. Burke, A Lesson in the Physics of Hybrid Electric Vehicles: Physics 451-452 Apr. 27, 2000. pp. 1-45.

U.S. Climate Change Technology Program, Reducing Emissions From Energy End Use and Infrastructure, Nov. 2003, pp. 1-3.

Thomas B. Gage et al, Low-Emission Range Extender for Electric Vehicles: SAE transactions, 1997—tzev.com.

Anthony J. Palumbo et al, Power Dense Induction Motor and Coordinated Inverter Drive: Motor & Drive Systems 2005, Feb. 8-9, 2005, Tampa FL.

Libor Prokop et al, 3-Phase PM Synchronous Motor Vector Control Using a 56F80x, 56F8100, or 56F8300 Device: Freescale Semiconductor Application Note AN1931 Rev. 3, Jan. 2005.

Martin Eberhard et al, The 21st Century Electric Car:, Tesla Motors Inc. Friday, Jul. 28, 2006, pp. 1-9.

Dal Y. Ohm, The Basics of Brushless Motor Drive Design, Drivetech, Inc. www.drivetechinc.com.

Matthew R. Cuddy, Analysis of the Fuel Economy Benefit of Drivetrain Hybridization: NREL, SAE International Congress, Feb. 24-27, 1997, Detroit, MI.

Xiao Wen-yong, et al, Regenerative Braking Algorithm for an ISG HEV Based on Regenerative Torque Optimization: J. Shanghai Jiaotong Univ. 2008, 13(2), 193-200.

Andrew Kallfelz, Battery Monitoring Considerations for Hybrid Vehicles and . . . : Battery Power Products & Technology Mag., May /Jun. 2006, vol. 10, Issue 3.

S. Drouilhet et al. A Battery Life Prediction Method for Hybrid Power Applications: NREL—35th Aerospace sciences meeting, Reno NV, Jan. 6-9, 1997.

Niels J. Schouten et al. Fuzzy Logic Control for Parallel Hybrid Vehicles: IEEE Transactions on Control Systems Technology, vol. 10, No. 3 May 2002, pp. 460-468.

Stridsberg Powertrain AB. Strigear hybrid technology; web page at http://www.powertrain.se/20-efficient-hybrid-vehicle-technology.html.

* cited by examiner

100

| 107 | VCU Application and Presentation layer |
| | HEV advanced control strategy |

230  106  VCU firmware and embedded lower level control and monitoring

Engine    Generator   Storage   Inverter   Motor   Wheels 103  104  105

Battery

Internal Combustion Engine — 101
Power Generator Motor — 102
Drive Motor Speed & Power Control Inverter
Drive Motor Generator

FIG. 1

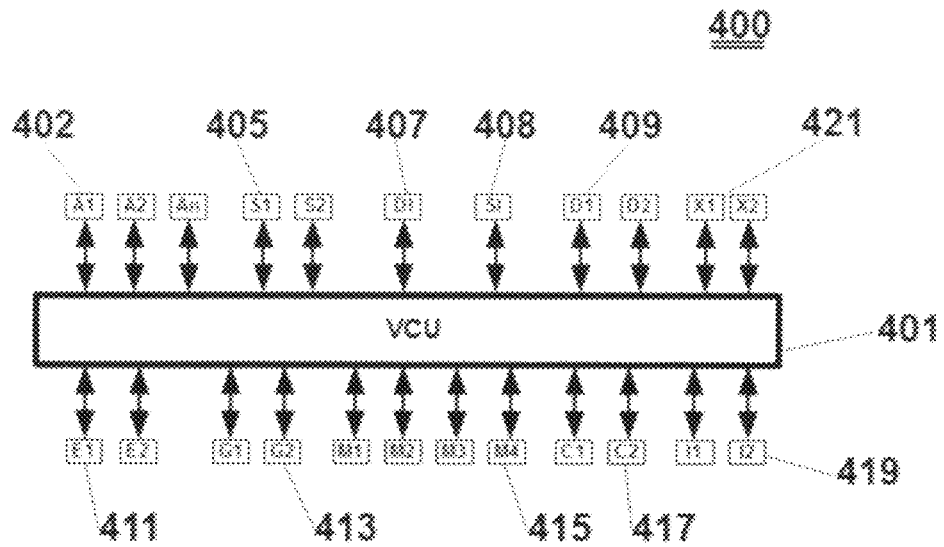

A – Accessories: Air conditioning, Lights, etc.

S – Storage Devices: Batteries, Capacitors, etc.

D – Display Devices to display system parameters such as speed, power, fuel consumption, etc.

DI – Driver Inputs: Accelerator, Brake, Hand Brake, Shift Modes, etc.

SI – System Inputs: Fuel consumption, Power consumption, Temperature, etc.

E – Internal Combustion Engine (ICE) Monitor and control RPM and Power

G – Power Generator with Power Inverter – driven by ICE
    Generates power to charge battery and supply power to drive motor M – Main Drive Motor (with power inverter) to drive vehicle wheels (1 to 4 drive motors)

C – Cooling system: Monitor and Control radiator, fluid pump, fan motors and valves I – Inverter or Power converter from main DC Link Voltage bus to supply internal power to vehicle
    Accessories or to supply external power as standby generator X – External communications using wireless or cellular data networks

| 502 | 504 | 506 | 508 | 510 | 512 | 514 |
|---|---|---|---|---|---|---|
| Unique Device ID | Device in Figure 4 | Input Parameter to VCU | Output Parameter from VCU | Units | Unique sub Parameter ID | Notes & Description |
| 1000 | E1 | Exhaust Oxygen | | | 1 | Fuel Injection control (exhaust Oxygen sensor) |
| | 516 | Air Intake Butterfly Position | | | 2 | Engine Power and Speed control for carbureted or fuel injected engines (others) |
| | | Air Intake Oxygen Sensor | | | 3 | Fuel Injection Control (air intake Oxygen sensor) |
| | | Manifold Vacuum | | | 4 | Timing Advance |
| | | Oil Pressure | | | 5 | Proper engine lubrication |
| | | Coolant Temperature | | | 6 | Proper engine operating temperature |
| | | Ignition Timing | | | 7 | Pulse when each cylinder is at the correct firing position |
| | | Humidity | | | 8 | Fuel Efficiency optimization |
| | | Barometric Pressure | | | 9 | Fuel Efficiency optimization |
| | | | Ignition Spark for Each cylinder | On/Off Pulses Volts | 10 | Engine Power and Speed control for carbureted or fuel injected engines (others) |
| | | | Fuel Injector pulse for Each cylinder | Pulse Timed Width Volts | 11 | Engine Power and Speed control for carbureted or fuel injected engines (others) |
| 2000 | E2 | Same as E1 | | | | Option for possible second Engine |

Hybrid Drive Train Components communication data structure with the VCU

| Unique Device ID | Device in Figure 4 | Input Parameter to VCU | Output Parameter from VCU | Units | Unique sub Parameter ID | Notes & Description |
|---|---|---|---|---|---|---|
| 3000 | G1 | Rotation Speed | | RPM | 1 | Rotational speed of generator |
| | | Generated Voltage | | Volts | 2 | Instantaneous voltage |
| | | Generator Temperature | | Deg. C or F | 3 | Fuel Injection Control (air intake Oxygen sensor) |
| | | Rotor Position | | degrees | 4 | Absolute Rotor position in degrees |
| | | Current | | Amps | 5 | Current to the DC Power Bus as Generator of Motor |
| | | | PWM signals | On/Off pulse in volts | 6 | Pulse Width Modulation to the inverter power switches |
| | | | On / Off signals | Pulse in Volts | 7 | Optional solenoid and switch controls |
| 4000 | G2 | Same as G1 | | | | Optional possible more than one and more than one type generation. Possible Fuel Cell, Solar and Heat source to generate power |
| 5000 | M1 | Rotation Speed | | RPM | 1 | Fuel Efficiency optimization |
| | | Bus Voltage | | Volts | 2 | Instantaneous voltage |
| | | Temperature | | Deg. C or F | 3 | |
| | | Rotor Position | | degrees | 4 | Absolute position in degrees |
| | | Current | | Amps | 5 | Current to motor when driving; current from motor in regenerative braking |
| | | | PWM signals | On / Off pulse in volts | 6 | Pulse width modulation to the inverter power switches |
| | | | Control signals | On / Off pulse in volts | 7 | Multiple control signals for synchro-lock coupling control in tandem drive and other control signals |
| 5200 | M2 | Same as M1 | | | | |
| 5400 | M3 | Same as M1 | | | | |
| 5600 | M4 | Same as M1 | | | | |

Hybrid Drive Train Components communication data structure with the VCU

| Unique Device ID | Device in Figure 4 | Input Parameter to VCU | Output Parameter from VCU | Units | Unique sub Parameter ID | Notes & Description |
|---|---|---|---|---|---|---|
| 7000 | C1 | Temperature | | Deg. C or F | 1 | Temperature of coolant in system |
| | | | On / Off signal | Volts | 2 | Valves, solenoids, fans or fluid pump motor switching |
| | | | On / Off signal | Volts | 3 | As 2 above can be more than one |
| | | Speed | | RPM | 4 | Fluid pumps and cooling fans speed measurement |
| | | | Speed | RPM | 5 | Fluid pumps and cooling fans speed control |
| 8000 | C2 | Same as C1 | | | | Optionally more than one cooling system possible. |
| 9000 | I1 | Output Voltage | | Volts | 1 | Measure generated voltage – DC or AC |
| | | Input Current | | Amps | 2 | Measure input current to inverter |
| | | | Control signal | Volts | 3 | Control of inverter output voltage / current |
| | | Temperature | | Deg. C or F | 4 | Inverter temperature |
| 10000 | I2 | Same as I1 | | | | |
| 11000 | A1 | Temperature | | Deg. C or F | 1 | |
| | | Input Voltage | | Volts | 2 | Optionally measure generated voltage; DC or AC |
| | | Input Current | | Amps | 3 | Optionally measure input current (power consumption) |
| | | Speed | | RPM | 4 | Optional motor speed measurement |
| | | | Speed | RPM | 5 | Optional Motor speed control |
| | | | On / Off signal | Pulse in Volts | 6 | Optional solenoid and switch control |
| | | | On / Off signal | Pulse in Volts | 7 | As 6 above and can be more than one |

Hybrid Drive Train Components communication data structure with the VCU

| Unique Device ID | Device in Figure 4 | Input Parameter to VCU | Output Parameter from VCU | Units | Unique sub Parameter ID | Notes & Description |
|---|---|---|---|---|---|---|
| 12000 | A2 | Same as A1 | | | | Optionally more than one set of accessories to monitor and control |
| 13000 | A3 | Same as A1 | | | | Optionally more than one set of accessories to monitor and control |
| 14000 | S1 | Temperature | | Deg. C or F | 1 | Measure temperature of individual cells and of system |
| | | Voltage | | Volts | 2 | Measure individual voltage of each element (# of cells) |
| | | Current | | Amps | 3 | Measure current for charging and discharging (SOC) |
| | | | On / Off Signal | Pulse in Volts | 4 | Optional switches to control power and configuration |
| | | | On / Off Signal | Pulse in Volts | 5 | As 4 above and can be more than one |
| 15000 | S2 | Same as S1 | | | | Optionally more than one storage system |
| 16000 | DI | Pedal position | | degrees | 1 | Accelerator pedal, Brake Pedal, and steering position |
| | | Mode switches | | On / Off volts | 2 | Measure switch positions; mode selector, ignition, lights, and other controls and indicators |
| 17000 | SI | Fuel flow | | ml/sec. | 1 | Instantaneous, total and average calculated |
| | | Vehicle speed | | Km or miles / hr | 2 | |
| | | Distance | | Km or miles | 3 | |
| | | Temperature | | Deg. C or F | 4 | Passenger compartment |
| | | Switches | | On / Off volts | 5 | Doors, trunk, hood and other switches |
| | | Digital codes | | Digital logic volts | 6 | OBD or other system parameters |
| 18000 | D1 | | Digital logic | Volts | 1 | Communicate system information to the display |
| 19000 | D2 | | | | | Optionally more than one display possible |
| 20000 | X1 | GPS coordinates | | Longitude and Latitude | | From GPS receiver – more data such as elevation also possible depending on service available |

Hybrid Drive Train Components communication data structure with the VCU

FIG. 5D

Route based Operational Drive Power Calculation

Drive Motor 1 / Generator Operation  Fig. 15

METHOD AND APPARATUS FOR A VEHICLE CONTROL UNIT (VCU), USING CURRENT AND HISTORICAL INSTANTANEOUS POWER USAGE DATA, TO DETERMINE OPTIMUM POWER SETTINGS FOR A HYBRID ELECTRIC DRIVE SYSTEM

CROSS-REFERENCE TO RELATED APPLICATIONS

This application is related to the following co-pending non-provisional utility applications:

Ser. No. 13/317,432 filed Oct. 18, 2011, titled "Method and Apparatus for a Hybrid Electric Drive Train Vehicle Control Unit (VCU) System."

Ser. No. 13/317,433 filed Oct. 18, 2011, titled "CONVERSION KIT FOR A HYBRID ELECTRIC DRIVE VEHICLE"

Ser. No. 13/317,431 filed Oct. 18, 2011, titled "Method and Apparatus for a two electric motor tandem drive system."

Ser. No. 13/317,452 filed Oct. 18, 2011, titled "Method for a Vehicle Control Unit (VCU) for control of the engine in a converted hybrid electric powered Vehicle."

Ser. No. 13/317,434 filed Oct. 18, 2011, titled "Method for a Vehicle Control Unit (VCU) for control of a Drive Motor Section of a two electric motor tandem drive system."

STATEMENT REGARDING FEDERALLY SPONSORED RESEARCH OR DEVELOPMENT

NONE

TECHNICAL FIELD

The present invention relates to the general field of Hybrid Electric Vehicle Drive systems, and in particular to a Vehicle Control Unit (VCU), using Current and Historical Instantaneous Power Usage Data, to Determine Optimum Power settings for a Hybrid Electric Drive System.

BACKGROUND OF THE INVENTION

There is a need for a Hybrid Electric vehicle conversion kit that can replace the components of an existing hydrocarbon fuel powered mechanical drive vehicle, wherein the components of the Hybrid Electric system are designed to fit within the space and weight limitations of the engine compartment of the existing vehicle. There is a need for a Hybrid electric vehicle conversion kit for existing vehicles that is designed with primary focus on ease of conversion, optimization of power generation and use, and automatic control of the hybrid electric drive train in a converted vehicle. This need is particularly intense in some developing countries, whose economies are insufficient to support sales of new Hybrid vehicles, except to the very wealthy. In such developing countries there exist thousands of inexpensive hydrocarbon fuel powered mechanical drive vehicles, which, if converted to Hybrid electric drive by means of a relatively inexpensive conversion kit, could not only reduce the dependence on hydrocarbon fuels and related carbon emissions, but also could be a source of backup electrical power for homes in areas where loss of domestic electric power may occur from time to time.

Moreover there is a need that is applicable to both hybrid conversions and new hybrid vehicles to maximize the efficiency of the electric drive system. Specifically, the maximum power of the drive motor to achieve the desired performance (acceleration) is considerably greater than the average power required (during steady driving). For general use, the maximum power is at least twice that of the worst case steady driving. If the drive motor is sized to the maximum power for acceleration performance, then it operates less efficiently when operating at steady driving conditions and will weigh more than what is required for steady driving conditions. Conversely, if the drive motor is sized to steady driving, the acceleration performance will be unacceptable. The problem then is, within the size and weight constraints, and the need for maximum efficiency, how does one provide an electric motor drive that is maximally efficient at steady state driving conditions while still delivering the desired acceleration performance.

By way of further explanation, in a hybrid vehicle there is a need for, at a minimum, an electric machine for generating power for charging the batteries. This electric machine, commonly referred to as the generator, is generally smaller and more efficient than the hydrocarbon fuel powered engine of the standard vehicle. A second electric machine, the drive motor, is dedicated to the task of driving the wheels (one or more motors may be used for this purpose) but is also used for braking where energy is put back into the batteries using the drive motor as a temporary generator that slows the car while generating power. Specific to conversions, and the goal of maximizing efficiency, there is a need to reduce the weight of the conversion components to a minimum. While this is a consideration in the design of a new hybrid vehicle, it does not have the degree of constraint that one faces in a conversion scenario. The need is therefore that one must keep the total weight of the drive components the same, or ideally less than, the conventional hydrocarbon fuel powered mechanical drive of the original vehicle. In a new vehicle, the design team has the flexibility of adjusting placement and sizing of items and the enclosing vehicle body as needed. A conversion kit's components however, must fit in the available space. Additionally, there is another problem in that hybrid vehicles need some means of powering auxiliary equipment, such as air conditioning, efficiently even when the engine is not operating. Accordingly, the problem then is, within the size and weight constraints, and the need for maximum efficiency, how is a conversion kit designed to have both a highly efficient drive motor and a generator appropriate for hybrid vehicle operations? And in addition, how are the various components controlled to insure this maximum efficiency is realized?

BRIEF SUMMARY OF THE INVENTION

A Vehicle Control Unit (VCU) apparatus and method for controlling the elements of a Hybrid Electric Drive Powered Vehicle are claimed, wherein the VCU uses Current and Historical Route Data to determine Instantaneous Power required by each of the elements, and wherein the VCU controls the Instantaneous Power used by each of the elements to minimize an amount of hydrocarbon fuel used while the vehicle is being driven, while also maintaining an acceptable battery state of charge and providing vehicle drive power as needed. The elements of a Hybrid Electric Drive Powered Vehicle as claimed comprise a hydrocarbon fuel powered engine, an electric battery system, a generator motor and one or more drive motors.

Also described and claimed is a method for using historical route data for similar routes, if available, to assist in determining the power requirements for elements of a Hybrid electric drive powered system. And if historical data is not available, a method is described and claimed for using recent vehicle route data and current vehicle route data to optimize the power settings of the elements of the Hybrid electric drive powered system to minimize the hydrocarbon fuel used by the hydrocarbon fuel powered engine.

BRIEF DESCRIPTION OF THE SEVERAL VIEWS OF THE DRAWING(S)

The features and advantages of the system and method of the present invention will be apparent from the following description in which:

FIG. 1 illustrates a standard Series Hybrid Electric Drive train, showing the five basic components and their general relationship to a Vehicle Control Unit (VCU).

FIG. 4 illustrates an alternative exemplary depiction of the VCU connectivity and the type of components it monitors, controls and with which it communicates.

FIGS. 5A, 5B, 5C and 5D illustrate an exemplary data structure for the various elements and parameters monitored and controlled by the VCU.

Figure 7:
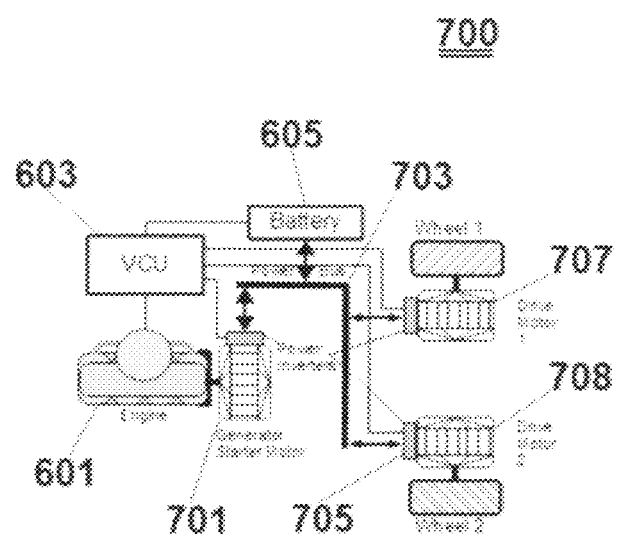
Figure 8A:
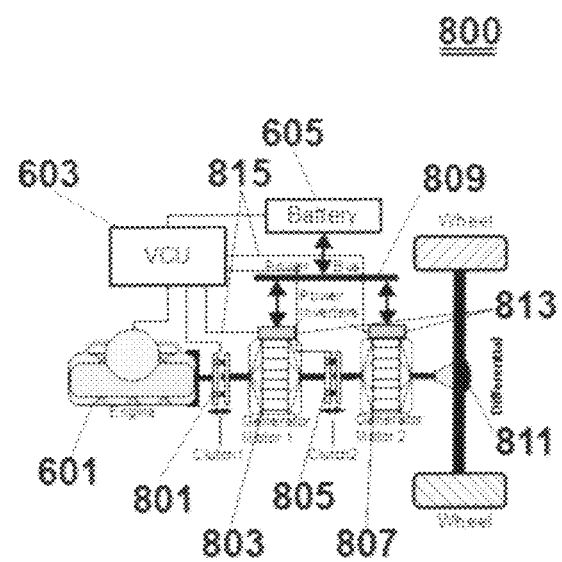

FIG. 7 illustrates an exemplary configuration of a basic drive train with two drive motors, one for each of the front or rear wheels FIG. 8A illustrates the tandem motor drive system of the present invention, showing two smaller motor/generators coupled physically through clutch 2, with clutch 1 coupling the engine 601 to the generator motor 1 801.

Figure 8B:
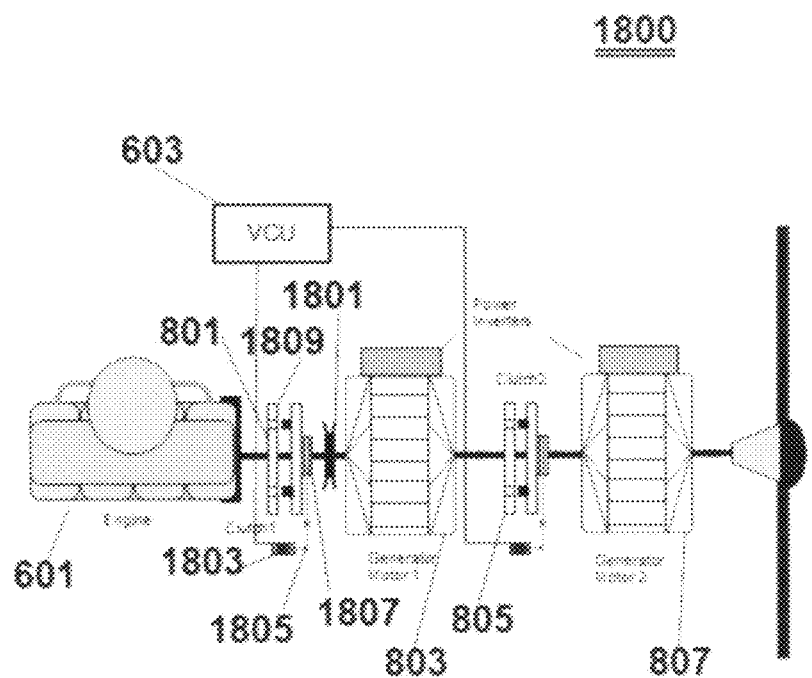

FIG. 8B shows the tandem motor configuration in more detail particularly with respect to the VCU control of the synchro-lock clutch mechanisms used.

Figure 9A:
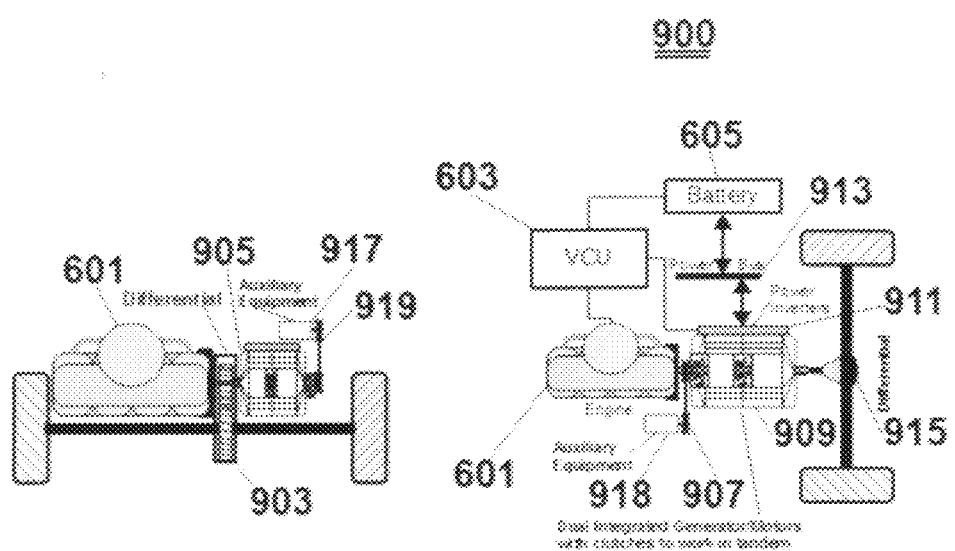

FIG. 9A shows two exemplary implementations of integrated tandem drives where the electric machines, the power inverters, and the required clutches are integrated into a single unit.

Figure 9B:
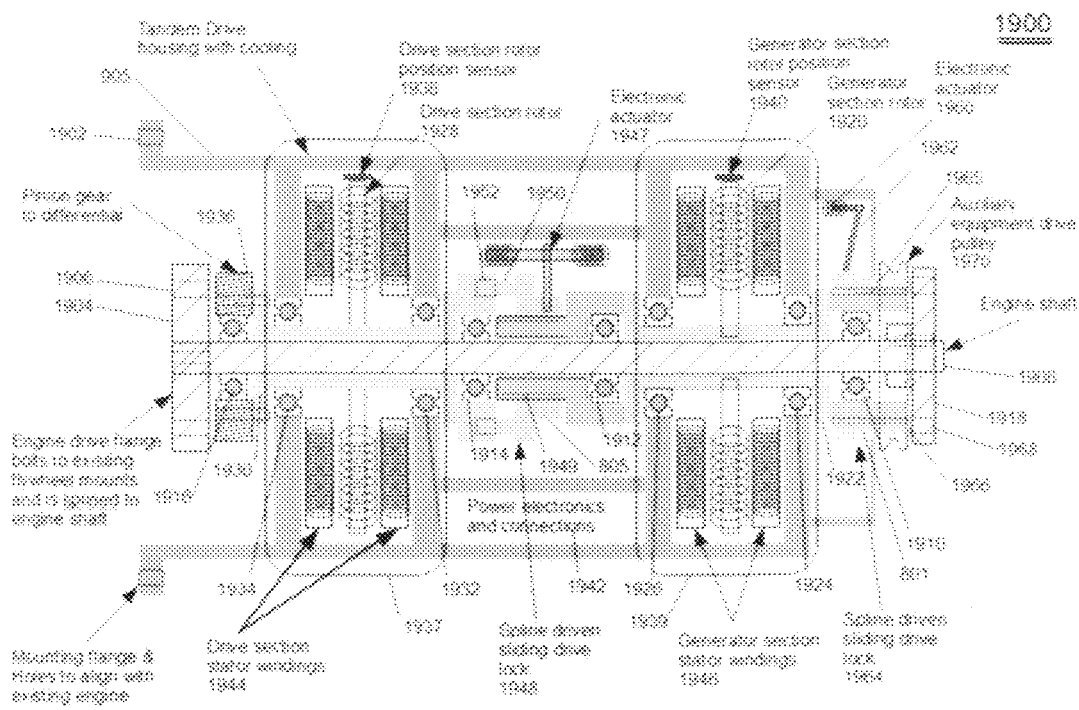

FIG. 9B is a cross section of an exemplary Dual Integrated Generator Motor unit for tandem drive with a transversely mounted drive train.

Figure 10:
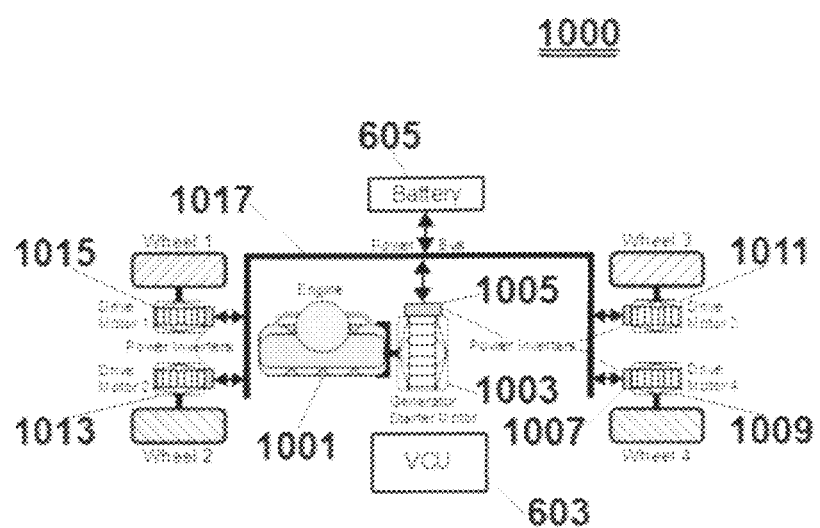

FIG. 10 shows a drive configuration where four much smaller motors coupled directly to the four wheels with no differential and a single generator coupled to the engine.

Figure 11:
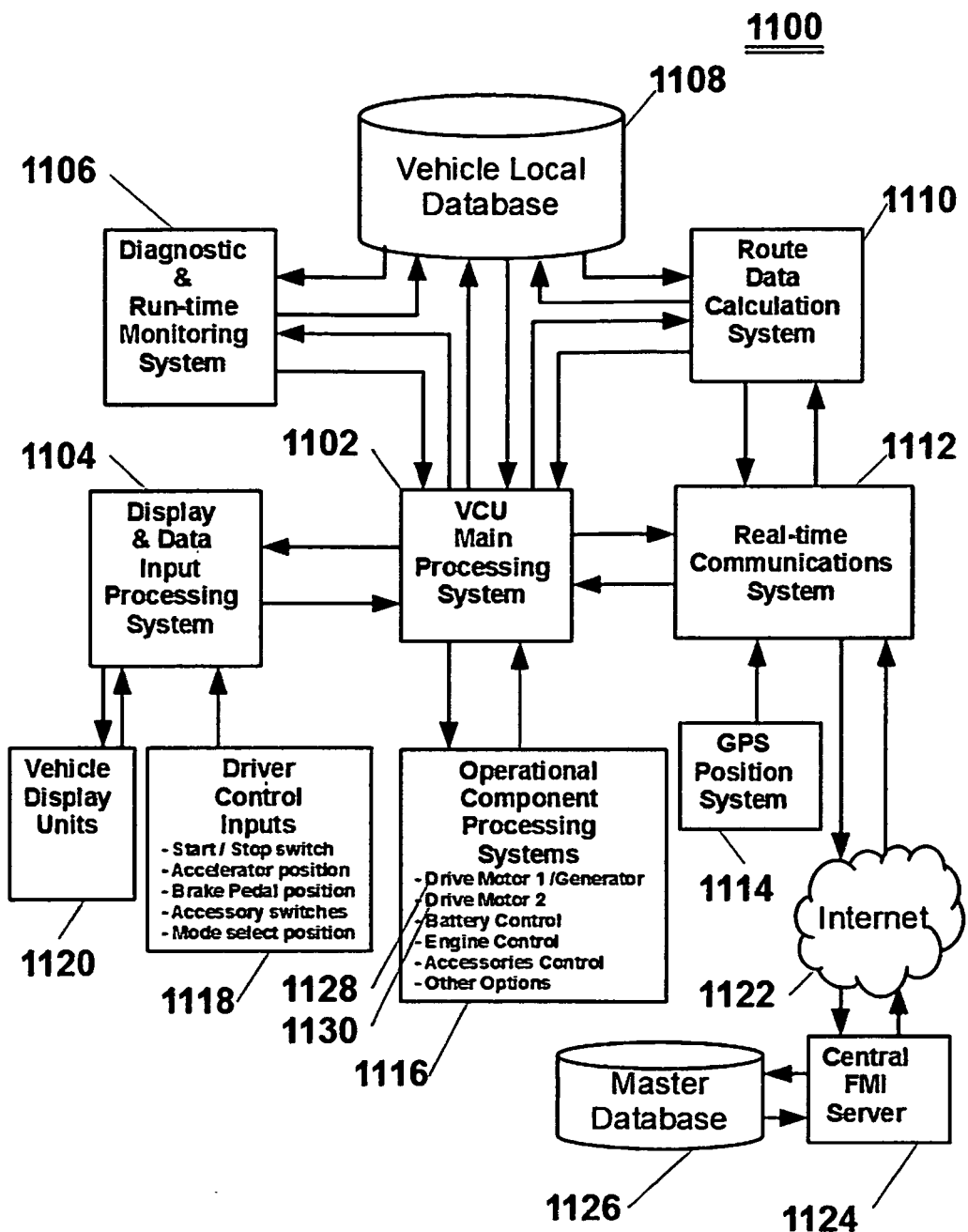

FIG. 11 is a diagram that illustrates an exemplary embodiment of the Vehicle Control Unit (VCU) System Architecture.

Figure 12:
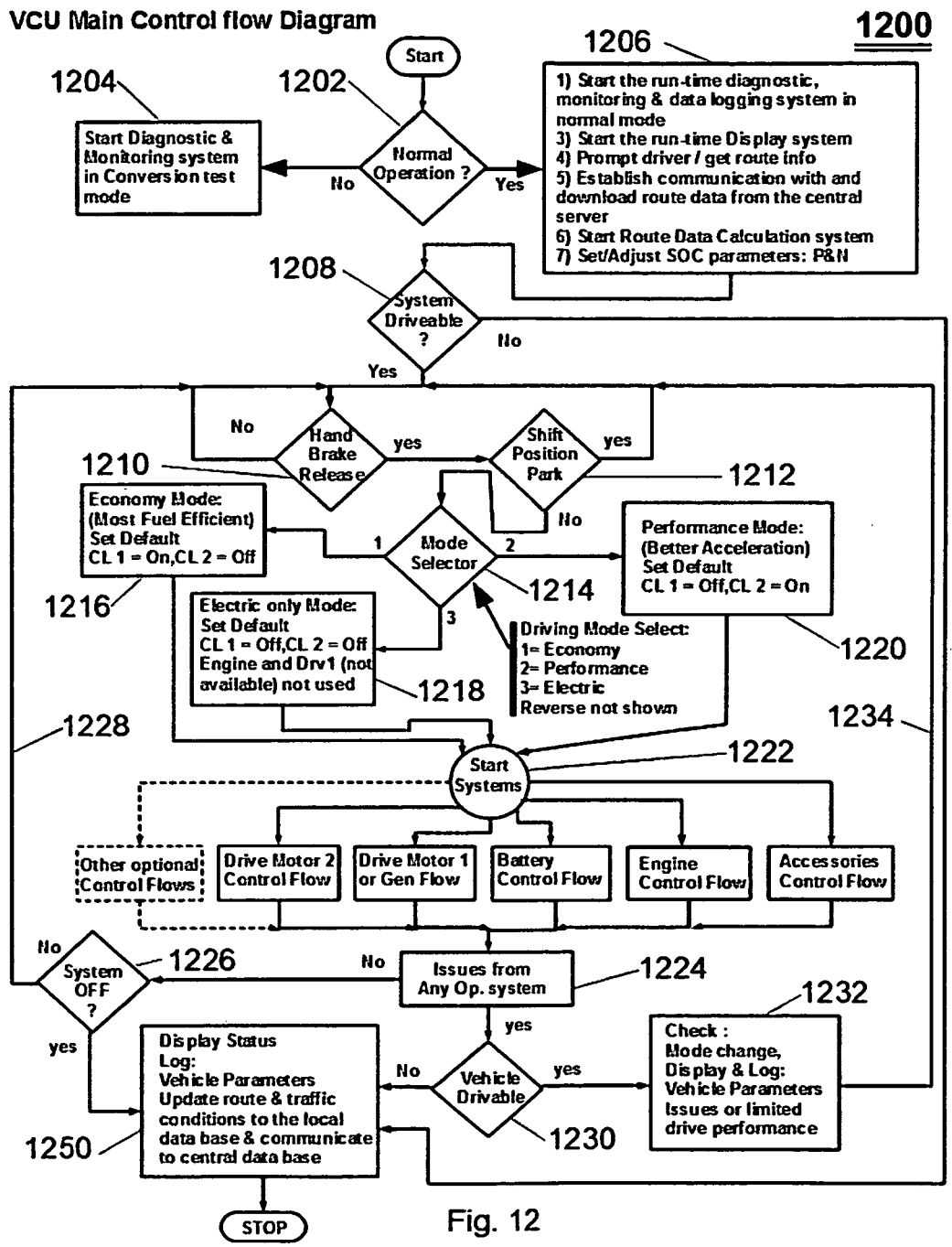

FIG. 12 is a diagram that illustrates a preferred embodiment operation of the Vehicle Control Unit (VCU) Main Processing System as shown in FIG. 11.

Figure 13:
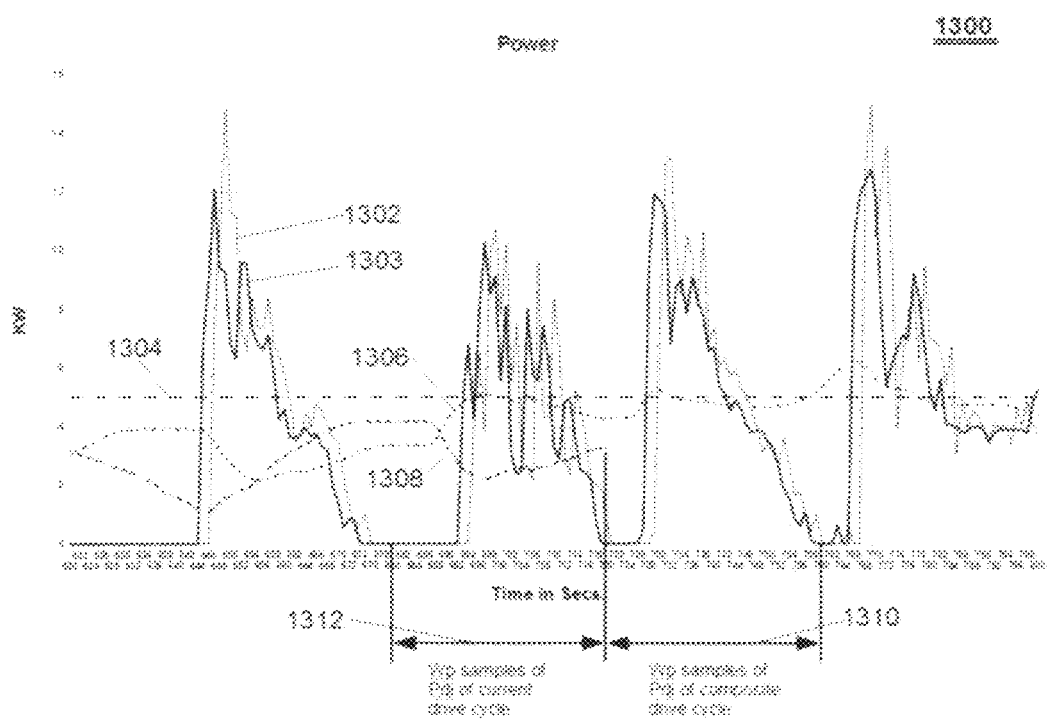

FIG. 13 is a diagram that illustrates an exemplary plot of power used over a portion of a drive cycle showing the various power values calculated.

Figure 14:
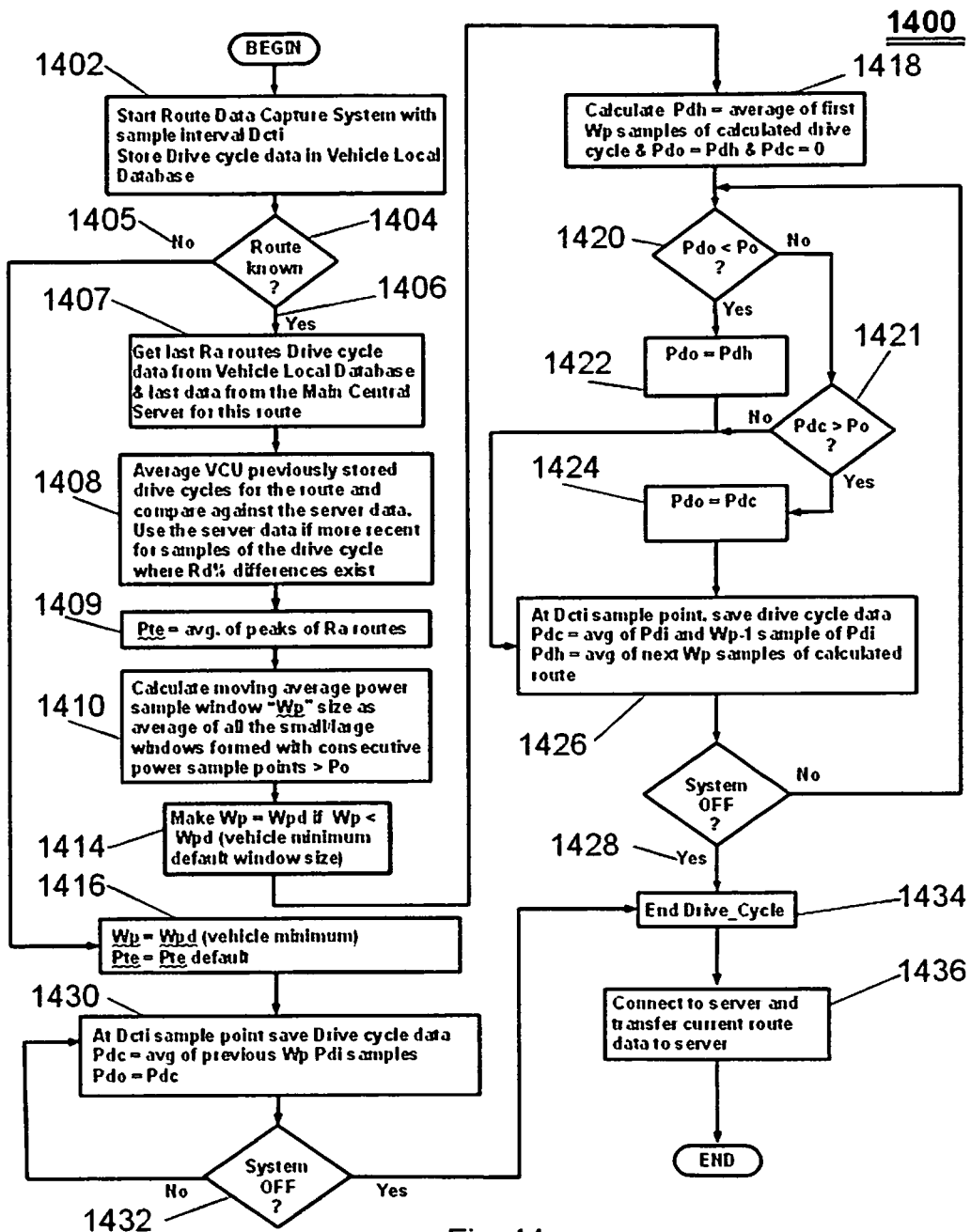

FIG. 14 is a flow chart showing an exemplary Power Requirement (Pd) Calculation process.

Figure 15:
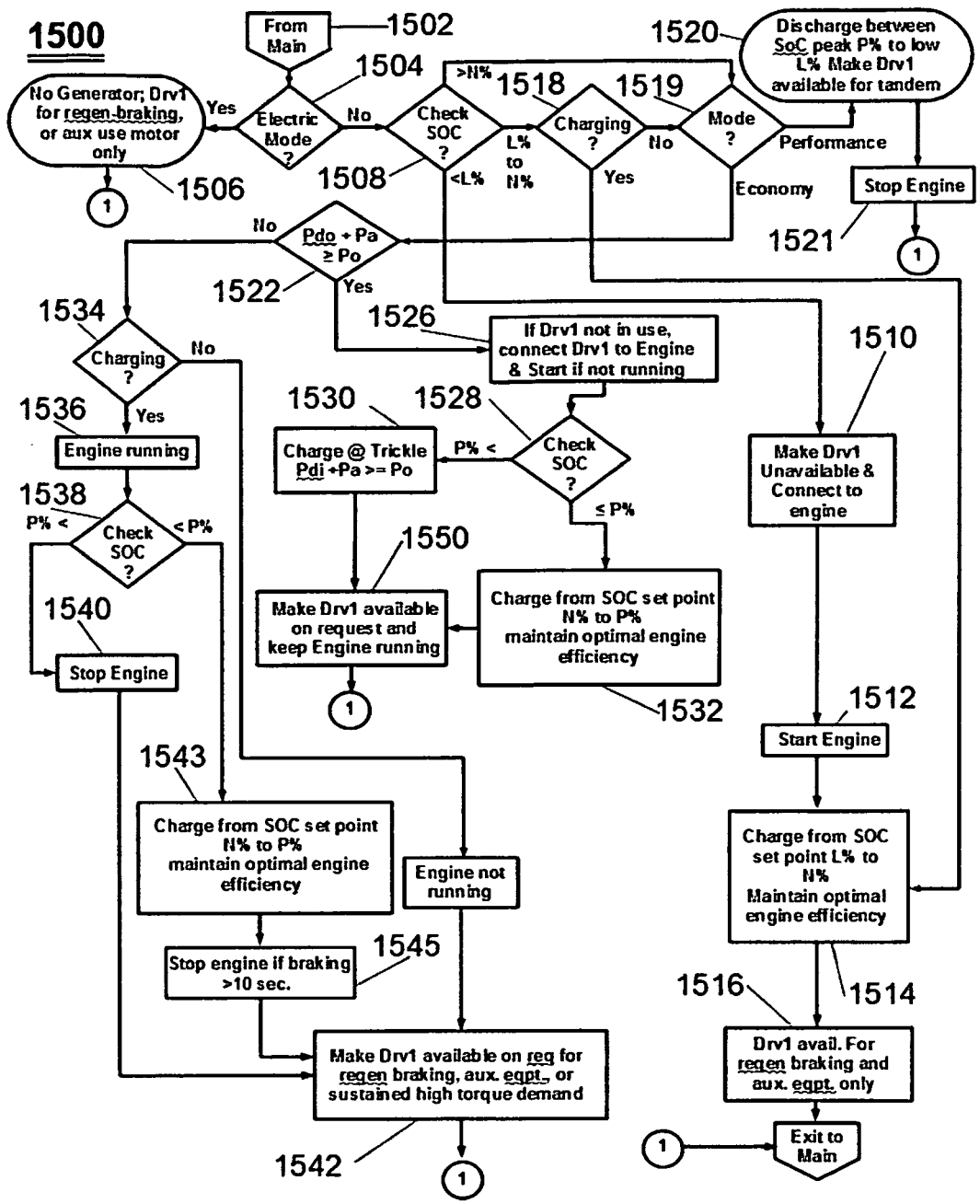

FIG. 15 is a flow chart that illustrates an exemplary operation of a current embodiment of the Engine Control and Drive Motor 1/Generator Operational Component Processing System.

Figure 16:
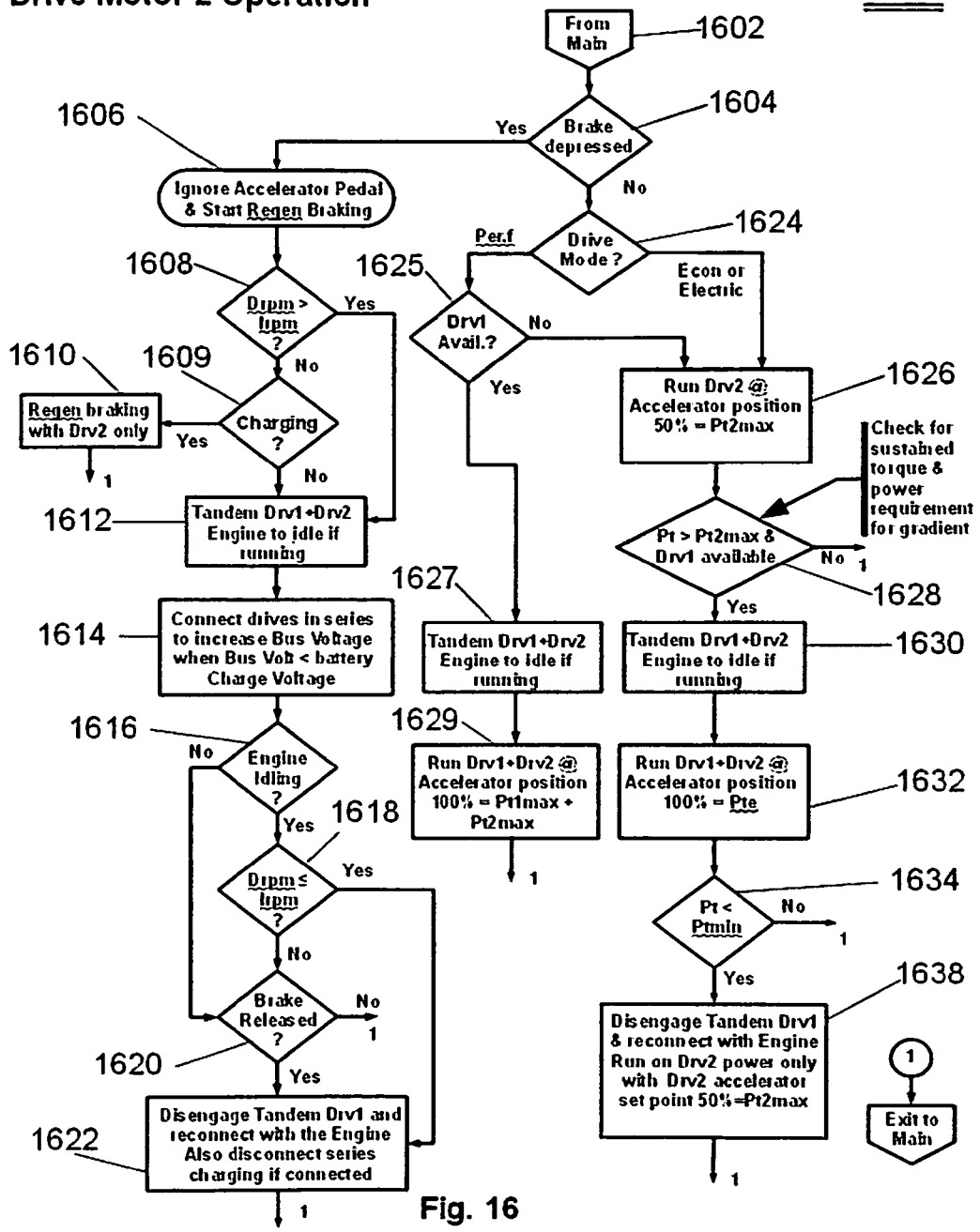

FIG. 16 is a flow chart that illustrates an exemplary operation of a current embodiment of the Drive Motor 2 Operational Component Processing System.

DETAILED DESCRIPTION OF THE INVENTION

The present invention provides a solution to the needs described above through an apparatus and method for converting an existing hydrocarbon fuel powered mechanical drive vehicle to a hybrid electric drive vehicle wherein a Tandem Drive system is used. The Tandem Drive system uses a motor that is sized for the required power to achieve the desired acceleration performance. That motor is designed as two coupled electric machines where the combined power is designed for that maximum desired acceleration performance. The two machines share a common shaft so that they can provide power to the drive wheels working in tandem, i.e. running at the same time at the same speed (because they are locked together).

When steady driving conditions exist, a mechanical synchronized coupling lock (synchro-lock coupling), referred to as a clutch but differing dramatically in its operation as will be described later, between the two halves of the machine is disengaged and only one half of the tandem drive then is used to drive the wheels. The second half of the machine is coupled to the engine at that point, using a similar synchro-lock coupling, and is used as a generator to charge the batteries, and to supply power to the drive motor directly. When conditions change such that more power is needed (rapid acceleration for example) or when maximum regenerative braking is needed, the generator portion is uncoupled from the engine and again coupled to the drive portion such that they can both provide the needed power or regenerative breaking capability.

The two halves of the tandem drive are sized such that the combination meets the worst-case power requirements and the drive section by itself is sufficient for the steady state requirements. The generator section is sized to provide "steady-state drive power" plus "Nominal battery charging power."

What is unique and non obvious from prior vehicle applications is the selective use of two electric machines "coupled" to one another for maximum power or uncoupled for steady state and limited acceleration driving. Also not obvious is the dual nature of the generator portion that can be coupled/uncoupled from the engine but also coupled/uncoupled from the drive motor. An initial embodiment of the invention will use separate electric machines with the coupling mechanisms external to the two electric machines. An additional embodiment has these two machines integrated into a single unit with the mechanical coupling mechanisms. These embodiments are explained in more detail below with reference to FIGS. 8A, 8B, 9A and 9B.

Also unique to the present invention is the ability to use the generator section of the tandem drive as a source of power for auxiliary equipment whether the engine is running or not. This is done based on the loading of the main drive section, the state of the engine and charging needs, and the anticipated operating conditions of the vehicle. For travel on a level surface at nominal steady speed, an embodiment would have the drive section of the tandem drive powering both the drive wheels and the auxiliary equipment. This is done by coupling the two sections of the tandem drive together and powering the auxiliary equipment through a connection to the shaft of the generator section, but not using the generator section either for power generation or for drive support as more fully described below. If the operational conditions change, or the batteries need to be charged, the system would uncouple the two sections of the tandem drive, couple the generator section to the engine, start the engine and then begin charging the batteries while also driving the auxiliary equipment. In these exemplary scenarios, the auxiliary peripherals like the air conditioning compressor and the hydraulic pumps are directly coupled to the generator shaft. So the power for the auxiliary equipment comes directly from the;

1) Engine when the generator is generating power for charging and providing power to the drive motor. The Generator coupling lock is engaged with the engine only, or
2) The Generator when not in use (not coupled with Engine or Drive motor) and can be run as a motor to provide power only to the auxiliary equipment, or
3) The Generator when the generator is run as a motor and is coupled to the main drive motor and to supply power both to the main drive motor and the auxiliary equipment, or
4) The Drive motor section when the generator is coupled to the drive motor but the generator is not operating.

These scenarios are controlled by the Vehicle Control Unit (VCU) component of the present invention, which is described in more detail below.

The Vehicle Control Unit (VCU) used in an embodiment of the present invention is a specialized computer system designed and built by Applicants to control a hybrid or electric vehicle. The initial use is in vehicles that have been converted to hybrid drive from their hydrocarbon fuel powered mechanical based drive. The VCU contains one or more standard processors, memory devices and input/output devices and interfaces required to manage all of the systems involved in controlling a hybrid vehicle, as described in more detail below.

The VCU continuously monitors various vehicle and driver inputs and controls the operation of the main vehicle systems with a goal of maximizing efficiency of operation. Applicants have designed and built the VCU because no commercially available systems exist which can be used for this purpose.

The main function of the VCU is to control the movement of the vehicle. This is done by controlling the power to one or more drive motors, which are attached directly to the wheels, or, which are coupled through conventional mechanical differential units. The VCU also controls the operation of a conventional hydrocarbon fuel powered engine (the engine) that is used to recharge the batteries, provide power to the drive motor and possibly power some auxiliary equipment such as air conditioning.

To control these two main systems, the VCU must have information about the vehicle, the driver inputs, and other supplemental information that is used to operate at optimum efficiency. This information includes:

The state of charge (SOC) of the batteries used as the main power source for the drive motor(s). This state of charge data includes:

Voltage

Percent charged/discharged
Recent history of charge/discharge
Long term history such as number of deep discharge cycles
Temperature
Drive motor information Position of the shaft and speed of rotation (if it is moving)
Temperature
Voltage/Current profile
Motor type information (number of phases, etc.)
Engine status Running or stopped
Speed (RPM)
Temperature/Oil Pressure/other critical operating indicators
Fuel pump/injection system operational parameters (if used)

-continued

Generator status

Shaft position and speed of rotation (if it is moving)
Coupled with the Engine or not (for tandem motor design)
Coupled with the Drive Motor or not (for tandem motor design)
Voltage/Current output
Temperature
Power Electronics status Error conditions
Temperature
Driver inputs Status of the vehicle—on or off
Emergency brake/"Park" engaged or not
Forward/Reverse direction selection and operating mode (economy/performance/electric only)
Accelerator pedal position/pressure
Brake pedal position/pressure
Destination
Vehicle operational information to provide additional efficiency information
Position from GPS
Stored frequent/typical route information
Nearby terrain data—map information stored locally or being obtained from outside sources (via wireless or Cellular data network)

The VCU also has control of auxiliary equipment such as Air Conditioning. These auxiliary systems are generally operated from the engine, but since an efficient hybrid only runs the engine when required by the SOC of the batteries, operation of auxiliary equipment must be otherwise powered. In the case of the present invention, one use of the tandem motor configuration is to allow the generator/motor to run the auxiliary equipment, under control of the VCU, when the engine is not operating. This is more fully described below with respect to FIG. 8B Referring now to the Figures as indicated, a current embodiment of the invention system and its significant components, and the currently identified best mode for making and using the invention, are described in further detail.

Referring now to FIG. 1, a standard Series Hybrid Electric Drive train is illustrated 100 showing the five basic components and their general relationship to a Vehicle Control Unit (hereinafter VCU) 106 107. The engine 101 drives the generator 102, which supplies power to charge the battery 103 and may also supply the power to the drive motor 105 while charging the battery 103. The main drive motor 105 is driven and power controlled by the inverter 104, which is taking control input from the VCU in response to movement of the accelerator pedal (not shown) and power from the battery 103. All of these basic components of a standard Series Drive train are coupled to and controlled by a VCU by monitoring complete system parameters (described more fully below with respect to FIGS. 3, 4 and 5), and by generating the optimal control outputs for the various components. An exemplary control mechanism 107, which runs on the VCU 106 to generate the control outputs is described more fully below.

Figure 2:
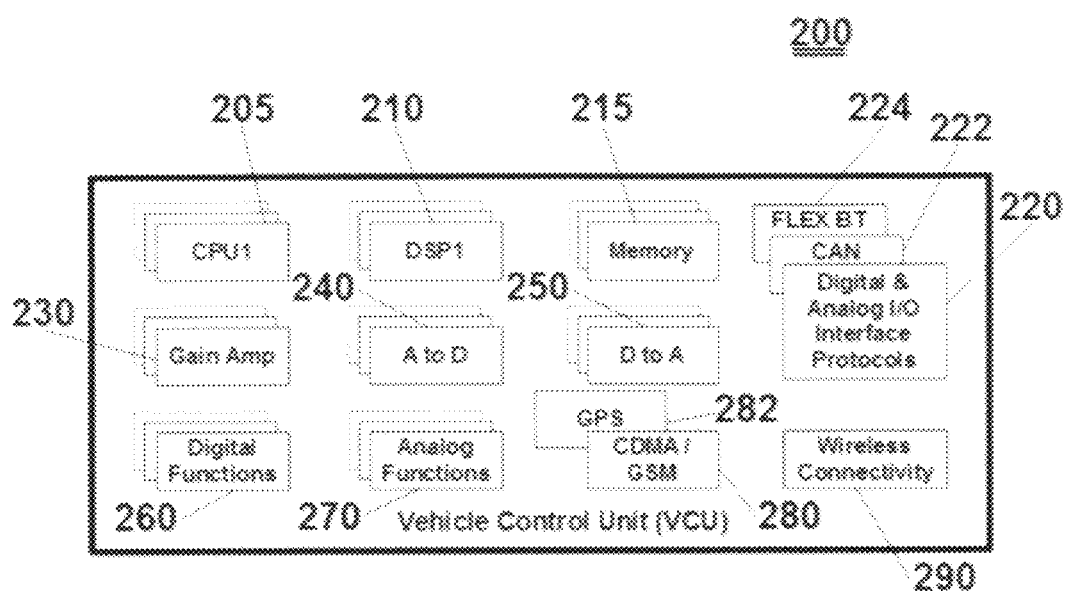
FIG. 2 illustrates an exemplary configuration of a VCU.

Referring now to FIG. 2, an exemplary configuration of a VCU 200 as used in the present invention is described. The exemplary VCU 200 comprises; one or more Central Processing Units (CPU, such as provided by Intel™, etc.) 205, one or more Digital Signal Processors (DSP, such as provided by Texas Instruments) 210, memory units 215 (typically 8 gigabytes), one or more Analog Gain Amplifiers 230, one or more Analog to Digital converters 240, one or more Digital to Analog converters 250, level shifters and isolation, analog and digital functions 260, 270, wireless 290 and cellular data network protocol 280 interfaces and some standard digital and analog interfaces 224 and 222, as well as some non-standard digital and analog interfaces 220. Also the VCU has position sensing capability using GPS 282.

Figure 3:
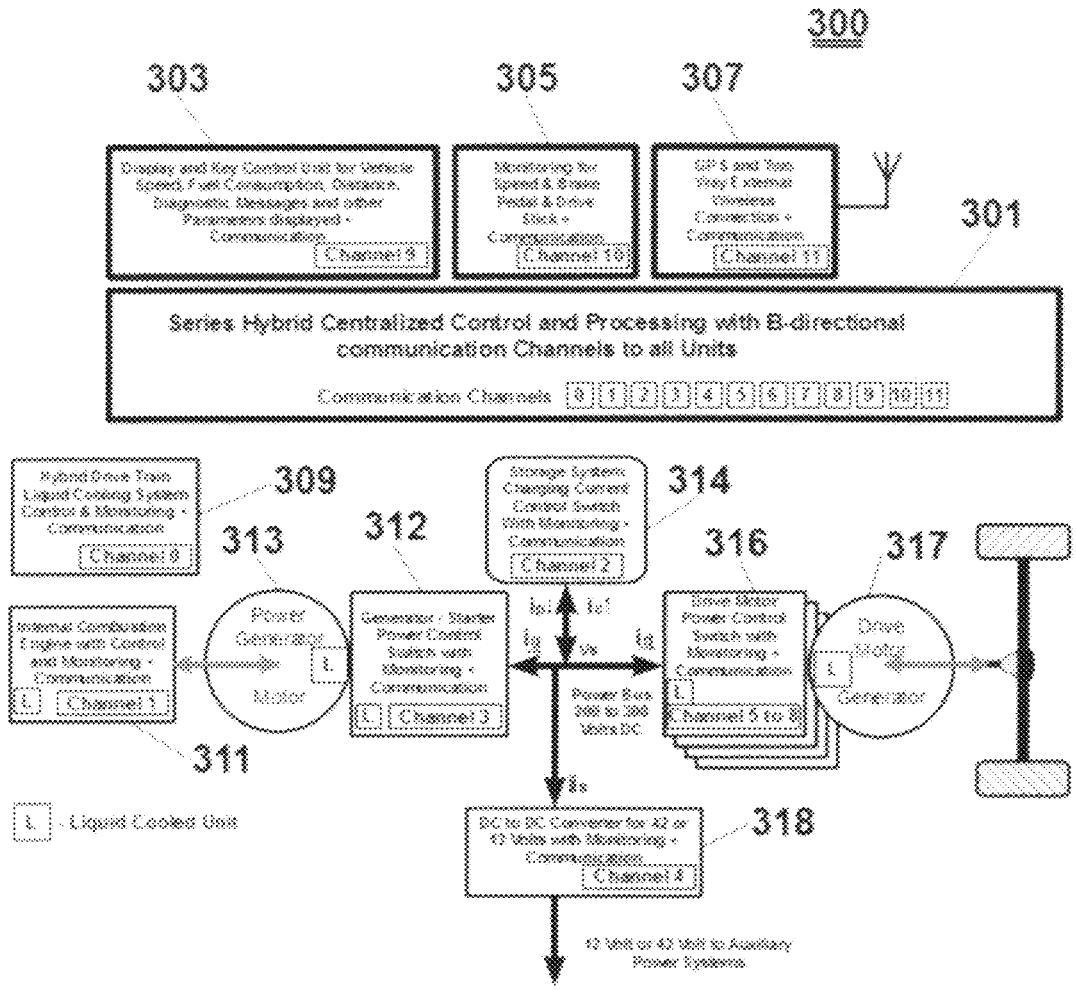
FIG. 3 illustrates an exemplary VCU configuration, controlling an exemplary combination of components of a two wheel drive electric hybrid drive train.

Referring now to FIG. 3, an exemplary VCU configuration 300 is shown controlling an exemplary combination of components of a two wheel drive electric hybrid drive train. The VCU is shown with GPS position sensing 307 to optimize system control for Battery State of Charge (SOC) and Internal Combustion Engine (ICE) efficiency. The exemplary communication channels 0-11 in an exemplary configuration of a VCU would comprise a centralized system control and processing of data to and from all units via bi-directional communication channels 301. Channel 0 in the VCU 301 is used to monitor and control communications from one or more liquid cooling system devices 309. Liquid cooled units in an exemplary configuration could include the engine 311, the generator motor 313, the generator starter power control switch 312, the storage system charging current control switch 314, the drive motor control switches 316 and the drive motor generator 317.

Channel 1 in the VCU 301 is used to monitor and control communications from the Internal Combustion Engine (ICE) 311 to monitor and control RPM and power as well as other engine functions as shown below with respect to FIG. 5A. Channel 2 in the VCU 301 is used to monitor and control communications from one or more storage devices (batteries, capacitors, etc.) 314. Channel 3 in the VCU 301 is used to monitor and control communications from and to the power generator and inverter 312. Channel 4 in the VCU 301 is used to monitor and control communications from the DC to DC converter for 42 or 12 volts 318. Channels 5-8 in the VCU 301 are used to monitor and control communications from and to up to 4 drive motors and related power inverters 316. Channel 9 in the VCU 301 is used to monitor and control communications from and to a key control unit 303 for control and display of data such as vehicle speed, fuel consumption, distance driven, temperature, diagnostic messages and other similar system inputs 303. Channel 10 on the VCU 301 is used to monitor and control communications from driver inputs such as, accelerator, brakes, hand brake, shift, modes, etc. 305. Channel 11 on the VCU 301 is used to monitor and control communications from a Global Positioning System (GPS) and other two-way wireless communications systems 307.

While the VCU as described above with respect to FIG. 3 depicts an exemplary control configuration, the VCU of the present invention is designed to be easily reconfigured to control a number of hybrid drive train configurations. Accordingly, a more general depiction of an exemplary VCU configuration is shown in FIG. 4.

Referring now to FIG. 4, an alternative exemplary depiction of the VCU connectivity and the type of components it monitors, controls and communicates with is shown 400. The VCU 401 can be connected to one or more accessory unit switches or sensors 402 such as air conditioner, lights, etc.; one or more electrical storage devices 405 such as batteries or capacitors; one or more drive motors and related synchrolock devices 415; one or more cooling units 417; one or more Inverters 419; and one or more generators 413. The exemplary VCU 401 can also be connected to one or more controls or sensors on an internal combustion engine 411 as well as to sensors on various driver units 407 such as accelerator, brakes, hand brake, gear shift, etc. The VCU 401 also can receive inputs from various units 408 such as the fuel flow sensor, voltage and current sensors (in order to calculate Power=voltage×current), temperature, etc. Similarly, the VCU 401 provides output data to various display devices 409 such as speed, power, fuel consumption, etc. The VCU 401 can communicate with other external systems through communications network connections 421 using standard wireless or cellular data networks.

All of the components shown in FIG. 4 may not be required for a particular drive train configuration. For example as is shown in the particular drive train configurations in FIGS. 6-10. In an exemplary configuration, the VCU communication channel or connectivity to a particular component uses a single DSP with analog and digital I/O and some standard interfaces as required.

FIGS. 5A-5D represent an exemplary data structure for the sensor and control data described above in FIGS. 3 and 4. FIG. 5A shows an exemplary layout of data words 500 related to exemplary devices as used in a particular Hybrid drive train configuration. For example, the data structure shown 500 is organized around a unique device ID 502 and a unique sub-parameter ID 512 for each device 504 and input 506 or output 508 parameter, including where relevant, the engineering units for each parameter 510. The parameters monitored/controlled are shown with respect to a device 504 described above in FIG. 4 and as cryptically described in the Notes & Description column 514. For example, in FIG. 5A, in column 504, the device indicated is "E1" 516, and corresponds to unit "E1" 411 in FIG. 4

Referring to FIGS. 6 to 10, these show some standard and unique Series Electric Hybrid Drive Train configurations. These configurations differ by the number of drive motors used with different sizes and a unique mechanical coupling. All of these exemplary configurations may be controlled by the VCU of the present invention for optimal system energy efficiency. These configurations are described in more detail below.

Configuration 1: Single Differential Drive

Figure 6:
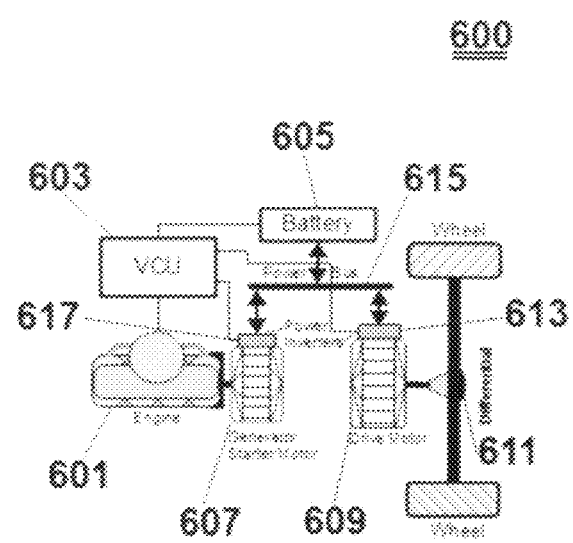
FIG. 6 shows an exemplary standard configuration for a Series Hybrid Drive Train.

FIG. 6 shows an exemplary standard configuration for a Series Hybrid Drive Train. The engine 601 is mechanically coupled to the generator 607 to generate power and supply power to the battery 605 (and the Power Bus 615 and drive motor 609) after being converted to DC power by the inverter 617. The battery 605 drives power to the inverter 613, which drives the single main motor 609, which is coupled to the wheels through the differential 611 to two wheels. The drive train can be front wheel or rear wheel drive configuration. The differential 611 plays an important role as it is redistributing power to the wheels optimally. The Drive motor 609 is bigger in size then the generator motor 607. The drive motor 609 peak power is supplied by the battery 605 storage for short durations which optimally can be charged by the engine generator 607 during steady state driving and slow driving cycles to maintain the required SOC. In an exemplary configuration of the present invention as described more fully below, the generator powers both the drive motor and charges the battery at the same time. Moreover, the VCU control strategies described in detail below for the two electric motor tandem configuration, apply to this standard configuration shown in FIG. 6 with the only difference being that, in the standard configuration, the generator motor cannot be used to assist the drive motor.

FIG. 7 illustrates an exemplary configuration of this basic drive train with two drive motors 707, 708, one for each of the front or rear wheels. This standard configuration is controlled (all components) by the VCU, which makes it possible to maintain the optimal SOC and optimal engine efficiency. VCU control strategies for optimal system efficiency are shown in FIGS. 11-16 as described more fully below. These control strategies make use of key parameter monitoring and control various elements of the system based on data related to vehicle route data, as more fully described below.

Configuration 2: Tandem Differential Drive

In the tandem motor drive system of the present invention, shown in FIG. 8A, two smaller motor/generators 803, 807 are coupled physically through Synchro-lock coupling 2, (also referred to variously as "clutch 2") 805, with Synchro-lock coupling 1 (also referred to variously as "clutch 1") 801 coupling the engine 601 to the generator motor 1 803. They can supply higher power together in tandem to the differential 811 when clutch 2 805 is engaged and clutch 1 801 is disengaged and the drive train works in electric only mode consuming stored energy from the battery 605. This configuration can be applied to front wheel or rear wheel drive. The tandem motors 803, 807 can only supply drive power for a short duration if the power source is stored energy only and the VCU 603 has to carefully manage power consumption. The higher power from the drive train is usually required for higher acceleration when going from stop or slower speed to a higher speed and the driver input requires a fast acceleration. Generally the sum of the power from the two motors 803, 807 is equivalent to the power of a single bigger drive motor required to drive the same curb weight car giving the same performance as in the previous configuration 1 (609 in FIG. 6). The two motors 803, 807 in tandem can also be used for regenerative braking to get higher energy back from braking or slowing down. Another major benefit of this configuration is lower weight and lower space requirements.

In FIG. 8B, when clutch 1 801 is engaged and clutch 2 805 is disengaged, the engine 601 supplies power to the Generator-Motor 1 Drv1 803. This generates electric power (through the power bus 809 in FIG. 8A) to the batteries 605 for charging, as well as supplying power to the drive motor Drv2 807. In this configuration, the drive motor "Genearator-Motor2" Drv2 807, supplies power to the wheels through the differential 811. In this mode the drive train works like a pure series configuration. The system is controlled by the VCU 603 for this tandem motor configuration, as described more fully below.

Following are the possible power modes or power flow scenarios for the two electric motor tandem configuration described below with respect to FIGS. 8A and 8B:

Where we designate Generator-Motor 1=Drv1, Generator-Motor 2=Drv2, E=Engine, D=Differential, and cryptically indicate that A→B="A" mechanically coupled to "B" and power flowing from A to B;

Generator-Motor 2 Drv2 (807 in FIG. 8A) is coupled to wheels in all modes through the differential 811. Generator Motors Drv1 803 and Drv2 807 are driven by switching converter (Inverter) 813, which converts power from DC to AC and back for generation and regenerative braking. The electric power goes through the Power Bus 809 and gets supplied to all components connected to the Power Bus 809. So when the battery 605 is getting charged, other accessories on the Power Bus 809 can also draw power.

1) E→Drv1, Drv2→D: Engine supplying power to Battery & Drive

2) Drv2→D: Only one motor driving the car and no generation

3) Drv1→E, Drv2→D: Drv2 driving the car and Drv1 starting the engine

4) Drv1→E: Starting the engine to charge battery and car stopped

5) E→Drv1: Engine supplying power to Generator to charge Battery & car stopped

6) Drv1→Drv2→D: Both motors working in tandem for acceleration. In this tandem configuration, when steady driving prevails, either of the motors can be turned off while the other powers the vehicle.

7) D→Drv2: Regenerative braking with single motor (charging battery)

8) D→Drv2→Drv1: Regenerative braking with both motors in tandem

9) E→Drv1→Drv2→D: This mode can possibly be used for higher power when all three power sources are coupled together to supply power to the car wheels. This will require both clutches 801, 805 to be engaged. This mode can only be used above the minimum engine RPM as it is directly coupled.

The shafts of the motors 803, 807 and engine 601 are aligned by the VCU 603 before the clutches 801, 805 are engaged so they act as direct mechanical locked couplings and are not required to be friction clutches as would be generally used in the automotive industry. The generator-motor 1 Drv1 803 shaft is aligned or rotated to the correct position before the clutch1 801 is engaged by the VCU 603. In FIG. 8A the VCU 603 is shown to have control connections to the two clutches 801, 805 directly but they can also be connected through the power converters control links or channel 815. In this embodiment of the invention, the clutch system requires that the position of both motor shafts is sensed and monitored.

FIG. 8B provides additional detail of an exemplary implementation of the tandem drive mechanism which employs two separate electric machines 1800. Clutch 1 801 is controlled by the VCU 603 through the electric actuator 1803. When activated, force applied by the electric actuator 1803 is transferred by the pivoting fork 1805, causing the drive plate 1807 to move axially on the shaft of generator-motor 1 803. When properly aligned by the VCU 603, pins protruding from the drive plate 1807 engage in mating holes in the secondary drive plate 1809 mechanically locking the two sections of the synchro-lock coupling together. When engaged, power can be transferred from the engine 601 to the generator-motor 803, or from the generator-motor 803 to the engine 601 without any loss of power or continuous power to the coupling control mechanism. The VCU 603 controls clutch 2 805 in a similar fashion when required by the operating conditions as described earlier.

Auxiliary equipment are driven by the generator-motor 803 or the engine 601, providing clutch 801 is engaged, through the auxiliary drive pulley 1801. Auxiliary equipment are driven by the pulley 1801 using standard belt and pulley arrangements common in automotive systems.

FIG. 9A shows two exemplary implementations of integrated tandem drives where the electric machines, the power inverters, and the required synchro-lock couplings (clutches) are integrated into a single unit. When it is running, the engine 601 supplies power to the generator-motor section of the Dual Integrated Generator Motor unit 909 or 905. The drive motor section of the Dual Integrated Generator motor unit 909 or 905, is directly coupled to the differential 915 for driving the wheels. The differential 915 is exemplary for a typical rear wheel drive vehicle or a front wheel drive vehicle with longitudinally mounted drive train. For a transversely mounted drive train, differential 903 would be used. The Dual Integrated Generator Motor unit 905 has a unique and new design shown in FIG. 9B and described later. This transverse mounted drive train is common among front wheel drive vehicles, but is also applicable to rear wheel drive vehicles if the engine is also transversely mounted in the rear of the vehicle. The Dual Integrated Generator Motor unit 905 can be used with either transverse or longitudinal drive trains.

Auxiliary equipment 917 or 918 are driven by conventional belt arrangements 907 or 919 from the auxiliary drive pulley 1801 shown in FIG. 8B and described earlier.

FIG. 9B is a cross section of an exemplary Dual Integrated Generator Motor unit 905 for tandem drive with a transversely mounted drive train 1900. Mounting holes 1902 are arranged to match the mounting points on the engine 601 in FIG. 9A to which the drive is being mounted. The engine drive flange 1904 is mounted to the existing flywheel mount points through mating holes 1906. The engine drive flange 1904 transfers power from the engine 601 in FIG. 9A to the engine shaft 1908 which passes through the center of the tandem drive unit 905. Bearings 1910 1912 1914 1916 allow the engine shaft 1908 to rotate completely independently of any other components in the tandem drive unit 905. The drive plate 1918 of clutch 1 801 attached to the engine shaft 1908 then is always coupled directly to the engine 601 in FIG. 9A.

Within the tandem drive unit 905, the generator section rotor 1920 and the generator section hub 1922 are a single unit supported by bearings 1924 1926 and therefore can rotate independently of the engine shaft 1908 and the tandem drive housing 905. In a similar fashion the drive section rotor 1928 and the drive section hub 1930 are independently supported by bearings 1932 1934 and therefore can rotate independently of the engine shaft 1908 and the tandem drive housing 905. The pinion gear 1936 is directly attached to the drive section hub 1930 to transfer drive power from the drive section 1937 of the tandem drive 905 to the remainder of the conventional differential 903 in FIG. 9A and thus to the wheels of the vehicle.

The drive section rotor position sensor 1938 sends the position of the drive section rotor 1928 to the VCU 603 in FIG. 9A. This is required both for proper operation of the drive section 1937 as a motor and also for the VCU 603 in FIG. 9A to align the generator section 1939 to the drive section 1937 when the two sections are to be operated together as described earlier. The generator section rotor position sensor 1940 sends the position of the generator section rotor 1920 to the VCU 603 in FIG. 9A. This is required for proper operation of the generator section 1939 as a motor, either for providing additional drive power, or for regenerative braking when coupled to the drive section 1937, when providing power to the auxiliary peripherals 917 in FIG. 9A as a motor, or when starting the engine 601 in FIG. 9A when coupled through synchro-lock coupling (clutch 1) 801. Generator rotor sensor 1940 position information is also used to align the generator section 1939 either to the drive section 1937 when preparing to provide additional drive power or to the engine 601 in FIG. 9A when coupling to the engine 601 in FIG. 9A for starting the engine 601 in FIG. 9A or generating power when the engine 601 in FIG. 9A is running.

Power electronics 1942 are mounted between the drive section 1937 and the generator section 1939 and are connected to the VCU 603 in FIG. 9A and the power bus 913 in FIG. 9A as described earlier. When drive power is required, the VCU 603 in FIG. 9A uses the rotor position information from the drive section rotor position sensor 1938 to determine the proper phasing for power to be supplied through the power electronics 1942 to the drive section stator 1944. Torque thus produced in the drive rotor 1928 is transferred directly to the pinion gear 1936 through the drive section hub 1930, independent of the rotation of the engine shaft 1908 or the generator section hub 1922.

When operational conditions require both the drive motor section 1937 and the generator section 1939 operating as a motor to provide power to the wheels, synchro-lock coupling (clutch 2) 805 is engaged. This is done under command of the VCU 603 in FIG. 9A in the following sequence. Firstly, the VCU 603 in FIG. 9A uses the generator section rotor position provided by the generator section rotor position sensor 1940 to determine the proper phasing of power to be supplied through the power electronics 1942 to the generator section stator windings 1946. This causes the generator rotor 1920 and associated hub 1922 to rotate. Secondly, when the VCU 603 in FIG. 9A determines that the drive section rotor 1928 and the generator section rotor 1920 are properly aligned, power is supplied through the power electronics 1942 to the Electronic actuator 1947. This generates sliding force on the spline driven sliding drive coupling lock 1948. This causes the drive coupling lock to slide along the axis of the engine shaft 1908, carried by the splines 1949 that are engaged with the generator section hub 1922. This movement causes the drive lock pins 1950 to engage with the holes 1952 in the drive section hub 1930. This action locks the generator section hub 1922 to the drive section hub 1930, adding the power supplied by the generator section 1939 to that provided by the drive section 1937 without any losses or need for continuous power to be supplied to the actuator.

When operational conditions require the generator section 1939 to be coupled to the engine 601 in FIG. 9A, this is done through synchro-lock coupling 1 801. Alignment of the generator section rotor 1920 with the engine drive plate 1918 is performed in a fashion similar to alignment of the drive section 1937 with the generator section 1939 described earlier. When alignment has been achieved, electric (that is, either electronic or electromagnetic) actuator 1960 is energized by the VCU 603 in FIG. 9A, through the power electronics 1942. The force created by electric actuator 1960 is transferred by the pivoting clutch fork 1962 to the spline driven sliding drive coupling lock 1964. This causes the drive coupling lock 1964 to slide along the axis of the engine shaft 1908, carried by the splines 1965 that are engaged with the generator section hub 1922. This movement causes the drive lock pins 1966 to engage with the holes 1968 in the engine drive plate 1918. This action locks the generator section hub 1922 to the engine 601 in FIG. 9A through the engine drive plate 1918 which is mounted on the engine shaft 1908 and coupled to the engine through the engine drive flange 1904. Power can now be transferred between the generator section 1939 and the engine 601 in FIG. 9A without loss.

Auxiliary peripherals 917 in FIG. 9A are connected to the auxiliary equipment drive pulley 1970 through conventional belt arrangements common in the automotive industry. The auxiliary equipment drive pulley 1970 is directly attached to the generator section hub 1922 and is supplied power either by the operation of the generator section 1939 by itself, joint operation of the generator section 1939 and the drive section 1937 when clutch 2 805 is engaged, or by the engine 601 in FIG. 9A when clutch 1 801 is engaged.

As may be seen from these descriptions of exemplary implementations of the Tandem Motor configuration and the VCU of the present invention, these exemplary configurations are uniquely designed to solve the current technical weight and space problems, providing a low-cost hybrid electric drive train for many types of existing vehicles. Moreover the flexibility and utility of the VCU of the present invention allows its use in Hybrid Electric conversion kits with more conventional drive motor configurations.

Configuration 3: Dual Motor Drive

FIG. 7 shows the drive configuration where two smaller motors 707, 708 are coupled directly to the two wheels with no differential and a single generator 701 coupled to the engine 601. The two drive motors 707, 708, which can also act as generators during braking, can be in a front wheel or a rear wheel drive power train. This configuration can use similar mechanisms and control strategies as used for configuration 1 and 2 above. Thus the VCU 603 can choose to use a single drive motor 707 or 708 for very slow speed driving for optimal system energy usage. This mechanism is engaged at slow speeds for safety reasons and can be modified for different terrains and traffic conditions. The optimal VCU 603 control strategies are shown below.

Following are the possible power modes or power flow scenarios for "Dual Motor Drive" configuration:

Generator-Motor 1=G, Drive Motor 1=M1, Drive Motor 2=M2,

E=Engine, Wheel 1=W1, Wheel 2=W2

A→B="A" mechanically coupled to "B" and power flowing from A to B

1) E→G, M1→W1 and/or M2→W2: Generator supplying power to battery and one or two drive motors 2) M1→W1 or M2→W2: Only one motor driving the car and no generation 3) G→E, M1→W1, M2→W2: Generator starting the engine and both motors driving the car 4) G→E: Starting the engine to charge battery and car stopped 5) E→G: Generator supplying power to Battery & car stopped 6) M1→W1, M2→W2: No generation and power supplied from the battery 7) W1→M1, W2→M2: Regenerative braking (charging battery)

Configuration 4: Four Motor Drive

FIG. 10 shows the drive configuration where four much smaller motors 1009, 1011, 1013 and 1015 are coupled directly to the four wheels with no differential and a single generator 1003 coupled to the engine 1001. The four drive motors 1009, 1011, 1013 and 1015 can also act as generators during braking. This four motor configuration is very similar to dual motor configuration 3. This configuration can use similar mechanisms and control strategies as used for configuration 1 and 2 above. The VCU 603 can choose to use a single drive motor or any combination of motors for very slow speed driving for optimal system energy usage. This mechanism is engaged at slow speeds for safety reasons and can be modified for different terrains and traffic conditions. The optimal VCU 603 control strategies for this "Four Motor Drive" configuration are shown below.

Following are the possible power modes or power flow scenarios for "Four Motor Drive" configuration:

Generator-Motor 1=G, Drive-Motor 1=M1, Drive-Motor 2=M2, Drive-Motor 3=M3, Drive-Motor 4=M4, E=Engine, Wheel 1=W1, Wheel 2=W2, Wheel 3=W4, Wheel 4=W4, A→B="A" mechanically coupled to "B" and power flowing from A to B;

1) E→G, M1→W1, M2→W2, M3→W3, M4→W4: Generator supplying power to battery and four drive motors. The motors can be engaged in multiple power combinations.

2) M1→W1 and/or M2→W2 and/or M3→W3 and/or M4→W4: Only one or any combination of motors driving the car and no generation 3) G→E, M1→W1, M2→W2, M3→W3, M4→W4: Generator starting the engine and a combination of motors 1, 2, 3 and 4 driving the car.

4) G→E: Starting the engine to charge battery and car stopped

5) E→G: Generator supplying power to Battery & car stopped

6) M1→W1, M2→W2, M3→W3, M4→W4: No generation and power supplied from the battery 7) W1→M1, W2→M2, M3→W3, M4→W4: Regenerative braking (charging battery)

The Vehicle Control Unit (VCU)

Referring to FIG. 11, a current embodiment of the Vehicle Control Unit (VCU) System Architecture 1100 is described. As indicated above with reference to FIGS. 2 and 3, the VCU comprises one or more CPUs, memories and interface units. Modern techniques common in the art are used to implement multiple processing systems as shown in FIG. 11; a VCU Main Processing System 1102, a Display and Data Input Processing system 1104, a Diagnostic & Run-time Monitoring System 1106, a Vehicle Local Database System 1108, a Route Data Calculation System 1110, a Real-time Communications System 1112, a Global Positioning System (GPS) System 1114, and a set of processing systems associated with each Operational Component 1116.

The Display and Data Input Processing system 1104 is electronically coupled to various driver control inputs 1118 (i.e. Start/Stop switch, accelerator position, brake pedal position, accessory controls, drive mode select position, etc.), whereby Driver control settings and responses are monitored and passed to other processing systems. The Display and Data Input Processing system 1104 is also electronically coupled to the Vehicle Display Units 1120, whereby informational display items and requests from other running processing systems are routed to the appropriate displays 1120.

The VCU Main Processing System 1102 is electronically coupled to the Display and Data Input Processing system 1104, to the set of Operational Component Processing Systems 1116, to the Real-time Communications System 1112, to the Route Data Calculation System 1110, to the Diagnostic & Run-time Monitoring System 1106 and to the Vehicle Local Database 1108. The Real-time Communications system 1112 is electronically coupled to the GPS Position System 1114 and to the Internet 1122 using either Cellular Data Networking 280 in FIG. 2, or Wireless networking 290 in FIG. 2. This connection to the Internet 1122 enables the VCU to communicate through the Real-time Communications System 1122 with the remote Central Fuel Motion Inc (FMI) Server 1124. The Central FMI Server 1124 provides access to the Master Database 1126 of historical Driver travel/route data, vehicle configuration and performance data, terrain data as well as other vehicle operation or Driver related data.

The VCU Main Processing System 1102 manages the operations of the other processing systems, the interactions with the Driver, and maintenance of the Vehicle Local Database 1108. This is described in more detail below with respect to FIG. 12.

The Diagnostic & Run-time Monitoring System 1106 comprises processes to run a special set of Conversion Diagnostic programs to assist in the Conversion of the Vehicle from its existing Hydrocarbon Fuel drive system to a Hybrid electric drive system. These conversion diagnostic programs are used to direct and assist a Conversion Technician in completing installation, testing and calibration of the hybrid electric drive system components. After the conversion process is completed these Conversion diagnostic programs are dormant and only run whenever activated by a specially trained Technician. After Conversion is completed the Diagnostic & Run-time Monitoring System 1106 comprises processes to run a Normal Run-time set of diagnostic programs when requested by the VCU Main Processing System 1102 when other running processes report a fault condition, or when the Display & Data Input Processing System indicates that the Driver or service technician has requested that the diagnostics be run.

The Route Data Calculation System 1110 comprises processes for determining operational parameters used by the Operational Component Processing Systems 1116 for optimum operation of the vehicle. This is described in more detail below with respect to FIG. 14.

The individual systems comprising the Operational Component Processing Systems 1116 are unique with reference to the Drive Motor 1/Generator System 1128 and the Drive Motor 2 System 1130. The Engine Control and Drive Motor 1/Generator System 1128 operation is described in more detail below with respect to FIG. 15. The Drive Motor 2 System 1130 is described in more detail below with respect to FIG. 16.

Referring to FIG. 12, operation of a current embodiment of the Vehicle Control Unit (VCU) Main Processing System 1102 in FIG. 11 is described. At system power up, a test 1202 is performed to determine if the system is operating in normal mode. This test is based on information stored in the system to indicate that the conversion has been completed properly and all system components are in place. If the system is not in normal mode, the conversion test mode of the Diagnostic and Monitoring System 1106 in FIG. 11 is started 1204.

When operating in normal mode, the VCU Main Processing System 1102 in FIG. 11 starts other processing systems 1206. The Diagnostic and Monitoring System 1106 in FIG. 11 must complete before the other processing systems are started. Upon completion of the diagnostics, the Display and Data Input Processing System 1104 in FIG. 11 is started at which point the driver is prompted to enter the destination for the current use of the vehicle. The Real-time Communications System 1112 in FIG. 11 is started and communication with the FMI Central Server 1124 in FIG. 11 is established to obtain the route information required by the Route Data Calculation System 1110 in FIG. 11 which is then started. Battery State of Charge (SOC) parameters are updated as required based on information obtained from the Diagnostic and Monitoring System 1106 in FIG. 11.

When system setup 1206 is complete, results from the Diagnostic and Monitoring system 1106 in FIG. 11 are tested 1208 to determine if the vehicle can be properly operated. If there are operational issues which prevent vehicle operation these are displayed to the driver 1250 and reported to the FMI Central Server 1124 in FIG. 11.

When the handbrake is released 1210 and the mode selector is moved out of the park position 1212, the mode is determined 1214. If the driver has selected the Economy mode 1216, Synchro-lock coupling 1 is engaged and Synchro-lock coupling 2 is disengaged. If the driver has selected the Electric only mode 1218 then both Synchro-lock coupling 1 and Synchro-lock coupling 2 are disengaged. In this mode both the engine and Drive motor 1 will not be used, unless Drive Motor 1 is needed to drive auxiliary equipment. If the driver has selected the Performance mode 1220 then Synchro-lock coupling 1 will be disengaged (CL1=OFF) and Synchro-lock coupling 2 will be engaged (CL2=ON), enabling both the main drive motor and the generator/motor to be used to drive the wheels.

After determining the operating mode and setting the proper parameters, the VCU Main Control system 1102 in FIG. 11 starts the other Operational Component Processing Systems 1222. Each of these systems runs separately and is described in later sections. When any of the systems completes and returns control to the VCU Main Control system 1102 in FIG. 11, exit conditions are tested 1224 to determine if there are any operational problems with the systems. If there are no operational problems with the systems, then a check is performed 1226 to determine if the driver is shutting down the vehicle. This would be indicated by the selector being put in the Park position, the handbrake being set and the "OFF" selection made on the control panel. If vehicle shutdown is not detected, then operation continues 1228. If shutdown is detected, the shutdown process 1250 is initiated wherein the shutdown message is displayed to the driver, vehicle parameters and the current route data are uploaded to the Remote FMI Central Server 1124 in FIG. 11 and the vehicle system shuts down.

In cases where Operational Systems report issues, these issues are compared to drivability criteria stored in the VCU to determine vehicle drivability 1230. If the vehicle is not drivable, the shutdown process 1250 is initiated with the display showing the problem that prevents vehicle operation. If the vehicle is drivable 1232, the problem is displayed to the driver and logged by the VCU, any operational parameters are updated and vehicle operation continues 1234.

Before describing these specific processing systems in detail, some general considerations, which guide these processes, are now discussed.

As described above with reference to FIGS. 8A, 8B, 9A and 9B, an exemplary implementation of the present invention, uses a two motor tandem configuration. In addition to providing solutions to the several technical problems mentioned in the Background Section of this application above, this two motor tandem configuration provides a unique capability to optimize the performance of the vehicle with respect to hydrocarbon fuel consumption. This is done through a process of controlling when the hydrocarbon fuel engine must be turned ON, due to a need for added drive power, or based on a need for real or anticipated battery SOC, or turned OFF, because it is not needed, either for drive power or for charging the battery. This process provides optimum drive power for the vehicle while maintaining desired battery state of charge (SOC) levels, and additionally provides for driver-selected efficiency operating modes, as described more fully below. This process provides this performance efficiency through a unique power optimization and expected power use system. This system is based on a set of data bases containing recorded drive power requirements of the instant vehicle for various routes driven in the recent past. Individual routes are identified by GPS readings for each vehicle "start location" and "destination location." Records of drive power requirements during such routes are recorded in a local database and used for predicting the drive power required for a current route, as more fully described below. These records are also transmitted to a remote server database, which contains records of similar data from similar vehicle types. As described below, the remote data is also used when necessary to augment the local data for predicting and control of current drive power requirements.

As indicated above, this process for performance efficiency permits the VCU to balance Battery charge states, vehicle operating modes, vehicle engine operation and tandem motor control. These various processes are now described in more detail.

Three operational Battery set points that are actively used by the VCU are Battery SOC (State of Charge) set points P %, N % and L %.

1) P %—Peak State of Charge, which the VCU will attempt to maintain at the highest possible value without losing any regenerative power. If this value is set too high the battery may not be able to absorb all the power from regenerative braking before 100% SOC is reached. If set too low then vehicle operation will not be able to utilize the maximum possible storage capacity of the battery in operating in a normal range from a nominal state of charge N % to P %. Whenever the VCU determines that regenerative power is lost because the battery has already reached 100% SoC, the set point value of P % is reduced. When 100% battery SOC value is never reached in a set time window for that route (can also average over multiple routes when route not selected by driver) the P % value can be increased to utilize more storage capacity. The limits for P % will also include some safety margins depending on the battery technology used. This parameter is used by the VCU whenever the system is turned on based on average operating conditions monitored and routes taken, as explained more fully below.

2) N %—Normal or Nominal battery SOC operating point which should generally be set to the ideal midpoint of the SOC between L % and P %. This midpoint will signify that the drive cycle is 50% slow or stop and go and 50% steady state higher speed (above 30 MPH). If the SOC P % is reached more often it means that the drive cycle is mostly steady state higher speed and the VCU should increase the used battery capacity (at the cost of reduced battery life) by reducing N % closer to L %. If, however, the system reaches L % more often, it means that the drive cycle is mostly slow or stop and go and the VCU should decrease the used battery capacity by increasing N % closer to P %. Hitting L % may also be the result of increased operation in Performance or Electric mode. If the system is hitting both P % and L % more often it can signify that the battery capacity may have diminished and may need to be replaced. Hitting L % more often will also increase the On/Off cycles of the engine which is detrimental to emissions and fuel economy. Having N % set to close to L % will also reduce the time the vehicle can be operated in Performance or Electric mode.

The process of setting N % will be done by the VCU each time the system is turned on. N % changes will depend on the average operating conditions of daily driving, routes taken and driver behavior. N % changes can also be set by the remote server based on conditions from other similar vehicles in similar conditions.

3) L %—This is the lower limit of SOC. This parameter will depend on battery technology used. If L % is reached often, it indicates that N % is set too close to L % and that N % should be increased.

Other conditions that affect the general calculations monitored and controlled by the VCU include those related to the Driving Mode selected by the driver. In an exemplary embodiment of the present invention these are the Performance mode, Economy mode and the Electric mode.

These three modes can be changed during run time and will allow the driver to economize on fuel when he chooses to do so. The electric only mode will allow the driver to use the car as a pure electric vehicle within a short range depending on the size of the battery. The battery can be externally charged if the driver desires and he can do his daily commute without using any engine fuel. In the low cost Tandem Drive Configuration these modes allow the driver to get the maximum performance, and best fuel economy to save on driving. The modes allow the driver to override the system if required.

The three driving modes that may be selected by the driver using the vehicle Mode selector are now described in detail.

1) Performance Mode:

In this mode the two drive motors start off coupled with Synchro-lock coupling CL2 engaged and Synchro-lock coupling CL1 disengaged (CL1=Off & CL2=On) 801 and 805 in FIG. 8B. This will provide maximum acceleration power. In this mode the vehicle is powered only by the battery as the Generator/Motor 1 Drv1 is not available for generation. If the driver decides to run in this mode on a continuous basis then he will reach the low state of Battery charge L %. If the vehicle is in the Tandem Motor configuration when this happens, the Generator/Drive Motor 1 Drv1 will be coupled to the engine to charge the battery regardless of the drive mode selected. When the battery SOC is below N % the Performance mode cannot be enabled. If the battery charge does fall below this value, it must be charged up to the N % value in order to get into the Performance mode. The battery can be charged in Park.

2) Economy Mode:

This is the fuel saving mode and restricts the acceleration performance of the car especially in the Tandem Drive configuration. In this mode the generator/Drive Motor 1 (Drv1) is always coupled to the Engine to generate power for the Main Drive Motor 2 (Drv2) and for charging the battery. It is only coupled to the Main Drive Motor 2 (Dvr2) for regenerative braking and when sustained high power is required for hill climbing or pulling higher payload. The Economy fuel saving mode uses the route information, as more fully described below, to maintain the optimum battery charge and take advantage of supplying direct power to Main Drive Motor 2 (Dvr2) as much as possible during the vehicle operation while minimizing engine Start/Stop operations. When the engine is running, the VCU will try to keep it running as much as possible until the vehicle reaches a stop. If the engine is not running then the VCU will not turn it on until a sustained speed is reached or a critical power requirement is identified. In this mode, the battery is charged while the car is moving to take advantage of supplying the power directly to the Drive Motor 2. In Economy Mode or Electric Mode, the maximum power provided by the combination of motors in a tandem drive system is limited to the peak power used in similar routes, which may be less than the full power capability to the tandem drive system.

3) Electric Mode:

In this mode the engine is normally not used to charge the battery.

Process for vehicle Drive Power Prediction and Control by the VCU.

As indicated generally above, this Master Process for vehicle Power Drive prediction and control as performed by the VCU, makes use of a local data base and a remote data base of vehicle power usage and drive conditions recorded during similar driving conditions, by similar type vehicles, traversing similar routes, from similar start to similar destination locations. The following data structure indicates data recorded, operating data sampled and recorded, and calculated parameters stored in each record. Data is typically sampled, and a record created and stored every second of a vehicles operation and stored in the local database. Typically, when a vehicle reaches the destination and the Driver turns the system OFF, the records from the local data base entered for this just-completed route, are uploaded to a remote server data base. These data are referred to as either route data or drive cycle data.

Data entered into a route record comprise the following:
Vehicle ID a unique number identifying the vehicle;
Vehicle type Code identifying different vehicles that are virtually identical.
Current Date and Time.
Start Location GPS data
Destination Location GPS data Default Setting Values for some Operating parameters comprising:

Dcti=Drive Cycle Time Interval used by the VCU for sampling various parameters during the drive cycle.

Po=A number indicating Optimum minimum engine power for best efficiency

Wpd=Moving Average Power Window Default Size=30 for example

Wp=Averaging window size being used;

Ra=A number (for example, 10) indicating how many route records to use from the local database, to generate a "composite" route record by averaging the individual data values from the Ra records.

Rd=A percent number (for example, 15%) indicating a Route Deviation percentage to be used to compare an instantaneous speed value from a local composite record at a given GPS point with a similar speed value at a similar GPS point in a master data base record.

Recorded sampled data values comprising:

a=time of this sample

Pdi=Instantaneous power being used

Pt=is a calculated value of the instantaneous driver requested power based on accelerator pedal position. Pt=% of accelerator pedal maximum position×currently assigned maximum power value.

Si=Vehicle speed;

Engine RPM

Engine Temperature

Drive Mode selected;

GPS coordinates at this sample time;

SOC=Battery State of Charge;

Calculated operating values comprising:

Pdo=Estimated Operational Drive power required;

Pdc=Moving average current value of the instantaneous power based on looking backward in time from the present time, using sample data recorded earlier in the current route;

Pdh=Moving average historical value of the instantaneous power based on looking "forward" in time from the present time, using historical sample data either from the local data base or the remote data base.

The Route Data Calculation System 1400, which is described in detail below with respect to FIG. 14, calculates an estimated operational Drive Power (Pdo) value based on a combination of the historical drive cycle records (if available) for the selected route as defined by the start location and destination location, and the drive cycle record data currently being captured as the vehicle is driven. If historical route information for similar start/destination locations is not found in the databases, then "Pdo" is set to Pdc, which is calculated by averaging current sampled data as the vehicle moves forward.

Referring now to FIGS. 13 through 16, descriptions are provided of the VCU calculation and control methods based upon the route to be traversed.

Referring now to FIG. 13, a plot of power used over a portion of a drive cycle is shown. Exemplary values for Wp 1310, 1312, Po 1304, Pdi 1302, Pdh 1306 and Pdc 1308 are shown. These exemplary values as shown in FIG. 13 are helpful in further understanding the Master Process for using such values to optimize performance vs fuel consumption.

As noted earlier, power usage and drive conditions are sampled at regular intervals and stored in a local database. At each sample time Dcti, the current power data 1302 and historical power data 1303 in a calculated composite drive cycle are used to calculate an estimated operational drive power Pdo (see FIG. 14, 1418-1426) used to control operation of the Generator 607 in FIG. 6. Pdc 1308 is calculated by averaging Wp samples 1312 of most recent power data 1302. Pdh 1306 is calculated by averaging Wp samples 1310 of historical power data 1303. Pdo defaults to Pdh 1306. If both Pdh 1306 and Pdc 1308 are above the optimum engine power control value Po 1304, then Pdo is set to Pdc 1308. When Pdc 1308 falls below Po 1304, Pdo reverts to Pdh 1306.

The moving power window of size "Wp" is incremented by one sample point after each Dcti interval as the vehicle moves forward.

Referring now to FIG. 14, an exemplary Pd Calculation process is described.

When vehicle operation is commenced by the driver, the VCU Main Processing System 1102 in FIG. 11 initiates diagnostics through the Diagnostic and Run-time Monitoring System 1106 in FIG. 11. When that completes successfully, several other systems are started including the Route Data Calculation System 1110 in FIG. 11.

When the Route Data Calculation System 1400 starts, it first initializes the Route Data Capture system 1402. Dcti defaults to 1 second but may be changed at conversion time or from the server 1126 in FIG. 11 as required for optimum operation of the specific vehicle in its predominant traffic patterns.

The Route Data Calculation System then determines if the route is known 1404. This is done by comparing the current vehicle location and destination as entered by the driver 1206 in FIG. 12 with the stored start and end points in the Vehicle Local Database 1108 in FIG. 11 and the Master Database 1126 in FIG. 11.

Pte, the peak power for economy or electric mode is set to the default value for this vehicle. If the destination is not entered or does not match any destinations in the Vehicle Local Database or Master Database 1405, then the default value is used for the Moving Average Power Window size Wp 1416. This default value is set at the time of conversion or servicing of the system. This default value may also be changed by the remote server.

For vehicle operation where the route is not specified or is not one of the stored routes 1405, Pdc is calculated at each Dcti interval to be the average of the most recent Wp samples of the actual Pdi data being captured for the current route. Then Pdo is always set to be Pdc. 1430.

The sampling and Pd calculation process 1430 continues as long as the vehicle is being operated. When the operator has both set the handbrake and pressed the ON/OFF control or switched the key to the OFF position 1432, the route is completed 1434. The VCU then contacts the remote server and transfers the locally recorded drive cycle records for this just-completed route to the server 1436 and the Route Data Calculation System exits.

Routes that are known 1406 are determined by comparing the current vehicle location and destination as entered by the driver 1206 in FIG. 12 with the stored start and end points in the Vehicle Local Database 1108 in FIG. 11 and the Master Database 1126 in FIG. 11. If the route exists on the Master Database 1126 in FIG. 11 with a start time within 30 minutes of the current time of day, the drive cycle data for the route with the closest start time to the current time is downloaded from the Master Database 1126 in FIG. 11. This 30 minute parameter for testing the start time window is set at conversion time and can be changed as required for optimum operation of the specific vehicle in its predominant traffic patterns. This default value of 30 minutes may also be changed by the remote server.

Then for routes that are known 1406, the Ra (Route average) number of instances of the most recent routes, with a starting time within 30 minutes of the current time, stored in the Vehicle Local Database are averaged together to form a Composite Vehicle Local Database route record 1407. Ra is set at conversion time to 30 but may be changed from the Central Server 1124 in FIG. 11 as required for optimum operation of the vehicle based on long term evaluation of collected drive cycle information. If the route exists both in the Vehicle Local Database 1108 in FIG. 11 and the Master Database 1126 in FIG. 11 then the route records downloaded from the Master Database are compared to the Composite Vehicle Local Database route record created from the Vehicle Local Database 1408. The comparison examines the vehicle speed from the local data Composite Route Record with that of the route records from the Master Database 1126 in FIG. 11 at each GPS position along the route. For contiguous GPS locations where the master database route is newer in time and the speed deviates by greater than Route Deviation (Rd) percent, the route data from the master database is inserted into the Composite Vehicle Local Database route record until the GPS coordinates and speed again deviate by less than Rd percent at a given Dcti time slot. This Composite Vehicle Local Database route record with changes from the Master Database 1126 in FIG. 11 will be stored in the Route Data Calculation System 1110 in FIG. 11 as the Current Operational Route 1408. As with the Route average Ra, the Route deviation Rd value may be changed from the remote Server 1124 in FIG. 11 as required for optimum operation of the vehicle based on long term evaluation of collected drive cycle information.

Next, the Ra routes are examined and the peak power of each route is noted. These peak power levels are averaged together and Pte, the peak power for economy or electric mode, is set to this average of peak power levels 1409.

Once the Current Operational Route has been established, the number of samples in the Instantaneous Power data averaging window Wp is calculated 1410 and may differ from the default used when no route is specified 1416. As illustrated above with respect to FIG. 13 this is done by examining the portions of the composite drive cycle information where the saved consecutive instantaneous power values Pdi are greater than the optimum engine power control value Po of the engine. Consecutive periods of time greater than one sample where Pdi 1303 is greater than Po 1304 are counted. The total number of samples where Pdi 1303 is above Po 1304 is averaged across the just counted number of periods. Wp is set to this average consecutive samples number. If the calculated Wp is less than the current default set for the vehicle, then the default value is used 1414.

Next, Pdh is calculated by averaging the positive Pdi values for the first Wp samples of the composite route as previously calculated 1418. Pdo is then set to Pdh and Pdc is set to 0.

The values Pdh and Pdc are moving average values of the instantaneous power of the drive motor or motors (The sum of power for Drv1 and Drv2 in the case of a tandem drive configuration where Drv1 is being used to provide additional drive power) calculated over the number of samples Wp as described earlier. These are used to smooth out the route data so that the engine is both started only when needed, and then run at an efficient operating point for as long as possible. Pdh is the average historical Power used over portions of similar routes, and Pdc is the average current Power used over the current route.

The expected Power required Pdo is compared to the optimum engine power control value Po during each Dcti period 1420. When Pdo is below Po, Pdo is assigned the average historical power used value Pdh 1422. When Pdo is equal to or greater than Po, Pdo is assigned the average current power used value of Pdc 1424, providing that Pdc is also equal to or greater than Po 1421. At the end of the sample period Dcti 1426, another sample period is initiated, and the current instantaneous power Pdi is used to determine a new value for Pdc by averaging it with the most recent Wp-1 samples of Pdi. Pdh is also re-calculated to be the next Wp samples of the Pdi data from the composite route data currently in use 1426.

The sampling and Pdo calculation process 1420-1426 continues as long as the vehicle is being operated. When the operator has both set the handbrake and pressed the ON/OFF control or switched the key to the OFF position 1428, the route or drive cycle is completed 1434. The VCU then contacts the external server and transfers the locally recorded drive cycle records for this just-completed route to the server 1436 and the Route Data Calculation System exits.

Referring to FIG. 15, the operation of a current embodiment of the Drive Motor 1/Generator Operational Component Processing System 1128 in FIG. 11 is described. As described above with reference to FIG. 12, The VCU Main Processing System 1102 in FIG. 11 starts the Drive Motor 1/Generator System as one of several systems started 1222 in FIG. 12. The primary objective of the Drive Motor 1/Generator System is to operate and optimally load the Engine 601 in FIG. 6 for maximum efficiency by supplying as much power as possible directly to the main drive motor Drv2 807 in FIG. 8A or additional drive motors if they are used, while optimally charging the Battery 605 in FIG. 6. In addition, the Drive Motor 1/Generator (Drv1) 803 in FIG. 8A may be used to supplement Drv2 807 in FIG. 8A depending on the driving conditions and the mode selection 1214 in FIG. 12. Drv1 803 in FIG. 8A would be used in conjunction with Drv2 807 in FIG. 8A to supply additional drive power for hill climbing or faster acceleration. Best efficiency is achieved if the engine 601 in FIG. 6 can be run for the longest period of time at high efficiency by combining charging the battery 605 in FIG. 6 and providing power directly to Drv2 807 in FIG. 8A. The engine 601 in FIG. 6 should be stopped when the vehicle is on a part of the route (drive cycle) 1300 which has slow speeds and the brake is pressed or the Battery 605 in FIG. 6 peak State of Charge (SoC) has been reached. Providing the Battery 605 in FIG. 6 has not reached its peak capacity (P %) the engine 601 in FIG. 6 can be loaded to its optimum engine power control value (Po) so as to run at its optimum efficiency. If the low SOC L % is reached, the engine must be started and the battery charged to at least the Nominal SOC N % for either the Economy or Performance modes.

The operational formula is:

$$Po = Pdo + Pa$$

where Pdo is the current operational power for the drive motor or motors as determined by the Route Data Calculation System 1400 and Pa is the auxiliary power used by auxiliary equipment 917 in FIG. 9A such as air conditioning, lighting and so forth. Charging is controlled by operation of the Engine 601 in FIG. 6, which controls the Drv1 803 in FIG. 8A (as a generator) voltage. Optimal Engine operation is maintained while charging the Battery 605 in FIG. 6 from its Nominal SOC (N %) or the Low SOC (L %) to its Peak SOC (P %) with current not being used by Drv2 807 in FIG. 8A or the Auxiliary Equipment 917 in FIG. 9A or other loads. Once the P % SOC is reached it is not possible to maintain optimal operation of the Engine 601 in FIG. 6 under slow driving conditions and it will be shut down. In addition, the Engine 601 in FIG. 6 will be shut down if the current to Drv2 807 in FIG. 8A decreases to zero as may happen during braking or significant traffic slowing.

When the Drive Motor 1/Generator Operational Component Processing System (1128 in FIG. 11) starts 1502, the selected driving mode is tested 1504. If the vehicle is in electric mode 1506 the Engine (601 in FIG. 6) will not be used and Drv1 (803 in FIG. 8A) may be used for powering Auxiliary Equipment (917 in FIG. 9A) or for regenerative braking. No further action is possible in this mode.

Next, the State of Charge of the Battery 605 in FIG. 6 is tested 1508. If the SOC is below the lower limit L %, Drv1 803 in FIG. 8A is set as not available for drive power 1510 and coupled to the Engine 601 in FIG. 6, the Engine 601 in FIG. 6 is started 1512 and charging is initiated 1514 to raise the SOC to at least the nominal N % set point. In this mode of operation, Drv1 803 in FIG. 8A is available for regenerative breaking and auxiliary power as required 1516 but is not available for additional vehicle drive power. If the SOC test 1508 shows the charge is above L % but below N %, and the system is charging 1518, then charging will continue 1514 and Drv1 803 in FIG. 8A. will be used only for regenerative braking and auxiliary equipment 917 in FIG. 9A 1516. When the SOC test 1508 finds the SOC between L % and N % and the system is not charging 1518 or the SOC is above N %, then the driving mode is tested 1519 to determine actions to be taken.

When the mode test 1519 determines that the Performance mode is selected, Drv1 (803 in FIG. 8A) is made available for tandem drive operation 1520. In this configuration Drv1 is used mainly for vehicle power, no generation will be done and the battery will be discharged from P % to L %.

When the Mode 1519 is set to economy, the engine 601 in FIG. 6 the optimum engine power control value Po is tested against the sum of the required auxiliary power Pa and the current value of Pdo 1522. If the sum of Pdo and Pa is greater than or equal to Po, the engine can be operated efficiently. If Drv1 803 in FIG. 8A is not in use providing added power for driving the vehicle, it is coupled to the engine and the Engine 601 in FIG. 6 and is started if it is not currently running 1526. The SOC of the Battery 605 in FIG. 6 is tested 1528 and appropriate actions taken.

When the SOC is greater than the Peak limit P % 1528, the Engine 601 in FIG. 6 operation and Drv1 803 in FIG. 8A generation are controlled to maintain only minimal charging (trickle) while Pdo+Pa>=Po 1530. If the SoC is less than or equal to P % 1528, then charging will be controlled 1532 to maintain Pdo+Pa>=Po. In either case, the Engine 605 in FIG. 6 will continue to run and Drv1 803 in FIG. 8A will be available as needed for vehicle drive requirements 1550.

In the test 1522 where Pdo+Pa<Po, and if the system is charging 1534 (implying that the Engine 601 in FIG. 6 is running 1536) then the Soc test 1538 will determine if the Engine 601 in FIG. 6 should be stopped. When the SoC reaches the Peak P % the engine will be stopped 1540. Drv1 803 in FIG. 8A is made available for all other uses 1542. Otherwise, charging will continue 1543 for the SoC between N % and P %. In this mode, Drv1 803 in FIG. 8 is available for regenerative braking or additional vehicle drive power 1542. If the brake is pressed for more than 10 seconds 1545, the Engine 601 in FIG. 6 will be stopped.

When the system is not charging 1534, implying that the engine is not running, then Drv1 is available for all other uses 1542.

Referring to FIG. 16, the operation of a current embodiment of the Drive Motor 2 Operational Component Processing System 1130 in FIG. 11 is described. As described above with reference to FIG. 12, The VCU Main Processing System 1102 in FIG. 11 starts the Drive Motor 2 System as one of several systems started 1222 in FIG. 12. The primary objective of the Drive Motor 2 System 1130 in FIG. 11 is to supply power to the vehicle wheels for acceleration and capture energy during deceleration using regenerative braking techniques common in the industry. What is different and unique in this system is the use of the Drive Motor 1/Generator (Drv1) 803 in FIG. 8A to assist Drive Motor 2 (Drv2) 807 in FIG. 8A during both acceleration and deceleration. Also unique is the use of route data from similar drive cycles to establish an upper limit on the power that will be supplied by the tandem motor arrangement for a known route, as a means of enforcing efficient driving habits.

The operational parameters are:
1. Pt—is a calculated value of the instantaneous driver requested power based on accelerator pedal position. Pt=% of accelerator pedal maximum position×currently assigned maximum power value.
2. Pt2max—the maximum power available from Drv2 807 in FIG. 8A
3. Pt1max—the maximum power available from Drv1 803 in FIG. 8A
4. Ptmin—tandem drive disengagement power, set at conversion time to be 60% of Pt2max but can be modified for optimum operation depending on vehicle conditions
5. Pedt50—a 50% accelerator pedal position value equal to the maximum power available from the drive motor (Pt2max).
6. Pedt100—a maximum accelerator pedal position value equal to a sum of the maximum power available from the drive motor section (Pt2max) plus the maximum power available from the generator motor section (Pt1max)
7. Pte—maximum allowable power value for economy or electric modes for the current route. This value, Pte, is a calculated value based on historical data.
8. Irpm—engine idle RPM when not loaded
9. Drpm—Current RPM of Drv2 807 in FIG. 8A

For the economy operating mode 1216 in FIG. 12 and electric only 1218 in FIG. 12 Drv1 803 in FIG. 8A is used mainly used mainly to provide power to the drive motor Drv2 807 in FIG. 8 and to charge the Battery 605 in FIG. 6 or assist Drv2 807 in FIG. 8A with additional drive power for short durations. In the performance mode 1220 in FIG. 12 Drv1 803 in FIG. 8A is primarily used to assist Drv2 807 in FIG. 8A. The Drive Motor 2 operation 1600 determines when to use one or both motors depending on the power requirements, the operating mode selected by the driver and the availability of Drv1 803 in FIG. 8A as it may be otherwise required for charging the Battery 605 in FIG. 6 or supplying power to auxiliary equipment 917 in FIG. 9A. Determination of when to use Drv1 803 in FIG. 8A is based on the currently required power Pt in comparison to the maximum available Ptmax of either Drv2 807 in FIG. 8A (Pt2max), or the sum of Pt2 max and the power of Drv1 803 in FIG. 8A (Pt1max). Switching between use of Drv2 807 in FIG. 8A only or the combination of Drv2 807 in FIG. 8A and Drv1 803 in FIG. 8A involves proper engagement or disengagement of the Synchro-lock couplings CL1 801 in FIG. 8A and CL2 805 in FIG. 8A. When CL1 801 in FIG. 8A or CL2 805 in FIG. 8A are to be engaged or disengaged, the speed of Drv1 803 in FIG. 8A must be matched to that of Drv2 807 in FIG. 8A or the Engine 601 in FIG. 8A depending on which Synchro-lock coupling is to be engaged. Pt is the current driver power demand and is calculated from the accelerator pedal position scaled such that a full pedal position is the maximum power that can be delivered by the system for driving the vehicle. For tandem drive mode this will be the sum of the tandem motor power values. In economy mode, 50% of the pedal position would be set to the power of the drive motor alone.

When the Drive Motor 2 Operational Component Processing System 1600 starts 1602, it first determines if the brake is being engaged 1604. If the brake pedal is depressed, then the accelerator pedal position will be ignored 1606 to avoid loss of energy from simultaneous operation of power application and braking. If the speed of Drv2 807 in FIG. 8A (Drpm) is higher than the engine idle speed Irpm 1608, then only the combination of Drv1 803 in FIG. 8A and Drv2 807 in FIG. 8A will be used for regenerative breaking 1612.

Providing that Drv1 803 in FIG. 8A is available, both Drv2 807 in FIG. 8A and Drv1 803 in FIG. 8A will be used for regenerative braking 1612. This is accomplished by disengaging Synchro-lock coupling CL1 801 in FIG. 8A, matching the speed of Drv1 803 in FIG. 8A to that of Drv2 807 in FIG. 8A, and engaging Synchro-lock coupling CL2 805 in FIG. 8A. If the generated voltage from either motor is less than the voltage required to charge the Battery 605 in FIG. 6, the Inverter 911 in FIG. 9A is switched by the VCU 603 in FIG. 6 to connect the inverters in series (generation mode) to increase the voltage above the minimum charging voltage 1614. If the Engine 601 in FIG. 6 is not idling 1616 and the brake pedal is still depressed 1620, regenerative braking with both motors will continue. If the Engine 601 in FIG. 6 is idling and Drpm drops to Irpm 1618, then Drv1 803 in FIG. 8A will be disengaged from Drv2 807 in FIG. 8A and engaged with the Engine 601 in FIG. 6 1622. At this time the Inverter 911 in FIG. 9A will be switched out of series generation mode. If Drpm>Irpm 1618 and the brake pedal is released 1620, then Drv1 803 in FIG. 8A will be disengaged from Drv2 807 in FIG. 8A and engaged with the Engine 601 in FIG. 6 1622 and the Inverter 911 in FIG. 9A will be switched out of series generation mode.

When Drpm is not greater than Irpm 1608 then the state of Drv1 is tested 1609. If Drv1 is being used for charging, then regenerative braking will be done with Drv2 only, with the charging and regenerative capabilities being added for maximum charging current.

If the brake pedal is not depressed 1604 then the system must provide power to the wheels. If the driver has selected the performance mode 1624, and if Drv1 803 in FIG. 8A is available, Drv1 803 in FIG. 8A and Drv2 807 in FIG. 8A will be used in tandem mode by disengaging Synchro-lock coupling CL1 801 in FIG. 8A, matching the speed of Drv1 803 in FIG. 8A to that of Drv2 807 in FIG. 8A and engaging Synchro-lock coupling CL2 805 in FIG. 8A. The power setting for the accelerator pedal position will be set such that the 100% pedal position corresponds to the sum of Pt1max and Pt2max 1629. This provides maximum acceleration using both motors at maximum accelerator position.

In electric only or economy mode 1624, the power setting for the accelerator pedal will be set such that 50% pedal position corresponds to Pt2max 1626. If the currently required power Pt is greater than Pt2max and Drv1 803 in FIG. 8A is not available 1628 (as will happen in these modes if the Battery 605 in FIG. 6 is being charged) then no change will be made to the motor configuration. If Drv1 803 in FIG. 8A is available 1628 then tandem drive will be engaged 1630 and the accelerator pedal position power setting will be changed such that 100%=Pte, the maximum power for economy or electric mode for the current route 1632.

When the current required power Pt drops below Ptmin 1634, tandem drive will be disengaged 1638 and the accelerator position setting returned to 50% corresponding to Pt2max as described previously. At this point Drv1 803 in FIG. 8A will return to supplying power to the Drive motor, charging the battery or supplying power to auxiliary equipment 917 in FIG. 9A.

Having described the invention in terms of a preferred embodiment, it will be recognized by those skilled in the art that various types of hardware may be substituted for the configurations described above in connection with the VCU to achieve an equivalent result. Similarly, variations in the equipment configurations and their installation configurations may be changed while achieving equivalent results. The foregoing detailed description should be regarded as illustrative rather than limiting and the appended claims, including all equivalents, are intended to define the scope of the invention.

We claim:

1. A Vehicle Control Unit (VCU) apparatus comprising:
   a. elements of a Hybrid Electric Drive Powered Vehicle comprising a hydrocarbon fuel powered engine, an electric battery system, a generator motor and one or more drive motors;
   b. one or more central processing units (CPU) and memory devices within the VCU for use in collecting and storing records of data comprising date and time data, vehicle start location Global Positioning System (GPS) data, destination location GPS data, present location GPS data, vehicle speed, battery State of Charge (SOC) data, and power used by the elements, these data referred to generally as Route Data;
   c. one or more Central Processing Unit (CPU) based processor systems contained within the VCU to monitor and record in memory the Route Data, to calculate expected power needed (Pdo) by the elements for continued operation, to compare this expected power needed (Pdo) by the elements to an optimum engine power control value (Po), to select power settings for control of the elements and to provide the selected power settings to the elements for a next driving interval; and
   d. the VCU controlling the power used by each of the elements to minimize an amount of hydrocarbon fuel used while the vehicle is being driven, while also maintaining a battery state of charge and providing vehicle drive power to the generator motor and the one or more drive motors as needed.

2. The VCU apparatus of claim 1 wherein the generator motor and one or more drive motors is a two electric motor tandem device comprising a generator motor section and a drive motor section.

3. The VCU apparatus of claim 1 wherein the one or more CPU based processor systems within the VCU that determines the expected power needed (Pdo) by the elements, makes use of the vehicle's current location from GPS data in combination with a moving average of historic instantaneous power usage data (Pdh) for similar routes taken by the vehicle, if such historic power usage data is available, and with a moving average of current power usage data (Pdc) for a route being currently traversed by the vehicle.

4. The VCU apparatus of claim 3 wherein the moving average of current power usage data (Pdc) is used as the selected power settings provided to the elements for a next driving interval if no historical data is available, and if historical data for similar routes are available, the historical moving average power data (Pdh) is used as the selected power settings.

5. The VCU apparatus of claim 4 wherein the historical moving average power data (Pdh) is used as the expected power needed (Pdo) settings until such time as the comparison of expected power needed (Pdo) is equal to or greater than the optimum engine power control value (Po) and the current moving average power data (Pdc) is greater than the optimum engine power control value (Po), in which case the current moving average power data (Pdc) is used as the expected power needed (Pdo) settings provided to the elements for a next driving interval.

6. The VCU apparatus of claim 5 wherein historical Route Data is stored in the VCU memory as well as in a remote server system, the remote server system containing Route Data for vehicles of similar type.

7. The VCU apparatus of claim 6 wherein records for current Route Data for a just completed route, are transmitted from the VCU memory to the remote server system.

8. A computer controlled method for controlling elements of a Hybrid Electric Drive Powered Vehicle (the vehicle), wherein the elements comprise a hydrocarbon fuel powered engine, an electric battery system, a two electric motor tandem configuration for use as both generator and drive power motors, the method comprising the steps of:
   a. providing a Vehicle Control Unit (VCU) having a central processing unit (CPU), a memory, and electronic couplings to a remote server system, to a Global Positioning System (GPS) and to the elements of the Hybrid Electric Drive Powered Vehicle;
   b. recording a first set of Route Data into a Current Route Data Record in the VCU memory, the first set of Route Data comprising a start location obtained from the GPS, a destination location entered by a driver of the vehicle, the Vehicle type and current date and time;
   c. searching historical Route Data records in the VCU memory for historical records which match the start location, destination location and vehicle type from the Current Route Data Record and transferring matching historical Route Data Records, if any, to a first temporary local storage in the VCU;
   d. averaging power values and speed values for fields in the matching historical Route Data Records held in the first temporary storage, and recording these average power and speed values in respective fields in an Operational Current Route Data Record;
   e. searching historical Route Data records in the remote server for historical records which match the start location, destination location and vehicle type from the Current Route Data Record and transferring any matching historical Route Data Records in the server to a Composite server Route Data Record;
   f. comparing vehicle speed values from the Composite server Route Data Record to the corresponding speed values in the Current Operational Route Data Record at each GPS position along the Route traveled; and
   g. inserting power values and speed values from fields in the composite server Route Data Record into the respective Current Operational Route Data Record fields in each GPS location where the Composite server Route Data Record is newer in time than the Current Operational Route Data Record and where the speed value in the Composite server Route Data Record field deviates by greater than Route Deviation (Rd) percent from the corresponding speed value in the Current Operational Route Data Record for that GPS location.

9. The computer controlled method of claim 8 comprising the additional steps of:
   a. setting a value for a moving average power window size (Wp) for calculating expected power needed values for the elements (Pdo) by calculating moving average current power values (Pdc) by averaging speed and power values from the current operational route data record, and calculating moving average historical power values (Pdh) by averaging speed and power values from the Composite server Route Data Record and calculating the initial Pdc and Pdh values for use as the expected power needed (Pdo) in controlling the elements as the vehicle begins its travel; and
   b. using the moving average of current power usage data (Pdc) as expected power needed (Pdo) settings provided to the elements for a next driving interval if no historical data is available, and if historical data for similar routes are available, using the historical moving average power data (Pdh) as expected power needed (Pdo) selected power settings.

10. The computer controlled method of claim 9 comprising the additional step of using the historical moving average power data (Pdh) as the expected power needed (Pdo) settings until such time as the comparison of the expected power needed (Pdo) is equal to or greater than an optimum engine power control value (Po) and the current moving average power data (Pdc) is greater than the optimum engine power control value (Po), in which case the current moving average power data (Pdc) is used as the expected power needed (Pdo) settings provided to the elements for a next driving interval.

11. The computer controlled method of claim 8 comprising the additional step of inserting the speed and power data from the composite server Route Data Records for subsequent GPS locations into the Current Operational Route Data Record until GPS coordinates and speed values in a given time slot record differ by less than the Route Deviation (Rd) percent.

12. The computer controlled method of claim 8 wherein a driver of the vehicle does not enter a destination location or where there are no records in the VCU memory or in the remote server which match the destination location entered by the driver, comprising the steps of:
   a. setting the value of the moving average power window size (Wp) to a default value;
   b. setting a value of the expected power needed (Pdo) by the elements of the Hybrid Electric Drive Powered Vehicle equal to values that are an average of instantaneous power values (Pdi) for a moving average power window size (Wp) for a most recent operation of the vehicle as recorded in a most recent Route Data record in the VCU memory for any destination; and
   c. thereafter setting the expected power needed (Pdo) by the elements, to the current power moving average power data (Pdc) as the vehicle proceeds on a current route.

* * * * *